(12) United States Patent
Kortschot

(10) Patent No.: US 12,257,492 B2
(45) Date of Patent: Mar. 25, 2025

(54) TRANSPORTATION DEVICE WITH PIVOTING AXLE

(71) Applicant: Leverage Design Ltd., Unionville (CA)

(72) Inventor: Mark Timothy Kortschot, Unionville (CA)

(73) Assignee: Leverage Design Ltd., Unionville (CA)

( * ) Notice: Subject to any disclaimer, the term of this patent is extended or adjusted under 35 U.S.C. 154(b) by 0 days.

(21) Appl. No.: 18/160,913

(22) Filed: Jan. 27, 2023

(65) Prior Publication Data

US 2023/0415024 A1 Dec. 28, 2023

Related U.S. Application Data

(63) Continuation of application No. 17/337,206, filed on Jun. 2, 2021, now Pat. No. 11,565,169, which is a continuation of application No. 16/197,058, filed on Nov. 20, 2018, now Pat. No. 11,033,799, which is a continuation of application No. 15/154,486, filed on May 13, 2016, now Pat. No. 10,137,356, which is a continuation of application No. 14/251,340, filed on
(Continued)

(51) Int. Cl.
| | | |
|---|---|---|
| A63C 17/00 | (2006.01) | |
| A63C 17/01 | (2006.01) | |
| A63C 17/04 | (2006.01) | |
| A63C 17/14 | (2006.01) | |
| B62K 3/00 | (2006.01) | |

(52) U.S. Cl.
CPC .......... *A63C 17/0073* (2013.01); *A63C 17/00* (2013.01); *A63C 17/0093* (2013.01); *A63C 17/012* (2013.01); *A63C 17/014* (2013.01); *A63C 17/04* (2013.01); *A63C 17/1418* (2013.01); *A63C 2017/1463* (2013.01); *B62K 3/002* (2013.01)

(58) Field of Classification Search
CPC . A63C 17/0073; A63C 17/00; A63C 17/0093; A63C 17/012; A63C 17/014; A63C 17/04; A63C 17/1418; A63C 2017/1436; B62K 3/002
See application file for complete search history.

(56) References Cited

U.S. PATENT DOCUMENTS

| | | |
|---|---|---|
| 213,546 A | 3/1879 | Cornelius |
| 215,081 A | 5/1879 | Turnbull |
| (Continued) | | |

FOREIGN PATENT DOCUMENTS

| | | |
|---|---|---|
| AU | 2005100475 | 6/2005 |
| CH | 598051 | 4/1978 |
| (Continued) | | |

OTHER PUBLICATIONS

International Search Report and Written Opinion for Application No. PCTUS2009/036428, mailed Oct. 21, 2009 in 17 pages.
(Continued)

*Primary Examiner* — Karen Beck
(74) *Attorney, Agent, or Firm* — Knobbe, Martens, Olson & Bear, LLP

(57) ABSTRACT

Devices and methods of transport are disclosed. Various embodiments include structural aspects related to steering and changing the direction of conveyances including features which utilize leaning or shifting of weight as part of turning.

16 Claims, 24 Drawing Sheets

Related U.S. Application Data

Apr. 11, 2014, now Pat. No. 9,339,720, which is a continuation of application No. 13/762,895, filed on Feb. 8, 2013, now Pat. No. 8,695,993, which is a continuation of application No. 13/481,636, filed on May 25, 2012, now Pat. No. 8,371,590, which is a continuation of application No. 12/399,893, filed on Mar. 6, 2009, now Pat. No. 8,186,693.

(60) Provisional application No. 61/064,458, filed on Mar. 6, 2008.

(56) References Cited

U.S. PATENT DOCUMENTS

| | | |
|---|---|---|
| 252,970 A | 1/1882 | Price et al. |
| 253,735 A | 2/1882 | Marshall |
| 304,949 A | 9/1884 | Mitchell |
| 311,936 A | 2/1885 | Wisewell |
| 319,839 A | 6/1885 | Nelson |
| 321,434 A | 7/1885 | Hanson |
| 321,466 A | 7/1885 | Wall |
| 329,927 A | 11/1885 | Mendenhall |
| 1,018,512 A | 2/1912 | Mees |
| 1,075,250 A | 10/1913 | Gingold |
| 1,194,102 A | 8/1916 | Webb |
| 1,387,091 A | 8/1921 | Woolley et al. |
| 1,550,985 A | 8/1925 | Schluesselburg |
| 1,603,529 A | 10/1926 | Faust |
| 1,632,997 A | 6/1927 | Connolly |
| 1,728,063 A | 9/1929 | James |
| 1,784,761 A | 12/1930 | Smith |
| 1,854,188 A | 4/1932 | Gregory |
| 1,935,187 A | 11/1933 | Kitselman |
| 2,051,762 A | 8/1936 | Vincent |
| 2,077,274 A | 4/1937 | Silkman |
| 2,086,471 A * | 7/1937 | Chapman .................. B62K 5/02 280/229 |
| 2,126,359 A | 8/1938 | Vogt |
| 2,136,306 A | 11/1938 | McCloy |
| 2,216,359 A | 10/1940 | Spencer |
| 2,413,530 A | 12/1946 | Taylor |
| 2,430,037 A | 11/1947 | Vincent |
| 2,460,395 A * | 2/1949 | Reid ....................... B62K 3/002 280/87.041 |
| 2,474,082 A | 6/1949 | Wutz |
| 2,509,324 A | 5/1950 | Horn |
| 2,857,008 A | 10/1958 | Antonio |
| 3,087,739 A | 4/1963 | Ware |
| 3,252,713 A | 5/1966 | Heller |
| 3,288,251 A | 11/1966 | Sakwa |
| 3,331,612 A | 7/1967 | Tietge |
| D214,252 S | 5/1969 | Andersen |
| 3,476,399 A | 11/1969 | Finn |
| 3,570,620 A | 3/1971 | Fischer et al. |
| 3,671,055 A | 6/1972 | Aarup |
| D226,440 S | 3/1973 | Bentley |
| 4,003,582 A | 1/1977 | Maurer |
| 4,037,852 A | 7/1977 | Bayer et al. |
| 4,043,566 A | 8/1977 | Johnson |
| 4,058,323 A * | 11/1977 | Ware, Jr. ................ A63C 17/02 280/841 |
| 4,061,350 A | 12/1977 | Schmidt, Jr. et al. |
| 4,094,372 A | 6/1978 | Notter |
| 4,127,282 A | 11/1978 | Gorlach |
| 4,152,001 A | 5/1979 | Christianson |
| 4,168,076 A | 9/1979 | Johnson |
| 4,180,278 A | 12/1979 | Gottlieb |
| 4,185,847 A | 1/1980 | Johnson |
| 4,272,091 A | 6/1981 | Ried, Jr. |
| 4,398,735 A | 8/1983 | Evans et al. |
| 4,402,521 A | 9/1983 | Mongeon |
| 4,403,784 A | 9/1983 | Gray |
| 4,417,737 A | 11/1983 | Suroff |
| 4,504,072 A | 3/1985 | Klawitter |
| 4,508,187 A | 4/1985 | Wenzel |
| 4,523,767 A | 6/1985 | Le Page |
| 4,546,841 A | 10/1985 | Sipiano |
| 4,681,333 A | 1/1987 | Rouge et al. |
| 4,645,223 A | 2/1987 | Grossman |
| 4,708,352 A | 11/1987 | Vullierme |
| 4,709,937 A | 12/1987 | Lin et al. |
| 4,738,456 A | 4/1988 | Creason |
| D299,260 S | 1/1989 | Vullierme |
| 4,842,091 A | 6/1989 | Badsey |
| 4,844,491 A | 7/1989 | Wheelwright |
| 4,930,794 A | 6/1990 | Chan |
| 4,955,626 A | 9/1990 | Smith et al. |
| 4,998,358 A | 3/1991 | Girardelli |
| 5,046,747 A | 9/1991 | Nielsen |
| 5,062,630 A | 11/1991 | Nelson |
| 5,092,614 A | 3/1992 | Malewicz |
| D326,290 S | 5/1992 | Badsey |
| 5,143,388 A | 9/1992 | Chen |
| 5,232,235 A | 8/1993 | Brooks |
| 5,236,058 A | 8/1993 | Yamet et al. |
| 5,263,725 A | 11/1993 | Gesmer et al. |
| 5,330,026 A | 7/1994 | Hsu et al. |
| 5,347,681 A | 9/1994 | Wattron et al. |
| 5,513,863 A | 5/1996 | Klamer et al. |
| 5,513,865 A | 5/1996 | Brooks et al. |
| 5,547,204 A | 8/1996 | Gamzo |
| 5,662,187 A | 9/1997 | McGovern |
| 5,730,241 A | 3/1998 | Shyr et al. |
| 5,741,018 A | 4/1998 | Huang |
| D395,479 S | 6/1998 | Gamzo |
| 5,797,466 A | 8/1998 | Gendle |
| 5,829,543 A | 11/1998 | Diaz |
| 5,848,660 A | 12/1998 | McGreen |
| 5,860,657 A | 1/1999 | Kroher |
| D410,268 S | 5/1999 | Yung |
| 5,915,707 A | 6/1999 | Steffen |
| 5,950,754 A | 9/1999 | Ondrish, Jr. |
| 5,971,411 A | 10/1999 | Jones et al. |
| 5,997,018 A | 12/1999 | Lee |
| D421,282 S | 2/2000 | Orr |
| 6,029,763 A | 2/2000 | Swisher |
| 6,050,357 A | 4/2000 | Staelin et al. |
| D424,979 S | 5/2000 | Hanagan et al. |
| 6,059,062 A | 5/2000 | Staelin |
| 6,070,885 A | 6/2000 | Ferone |
| 6,079,724 A | 6/2000 | Lin |
| 6,139,035 A | 10/2000 | Tsai |
| D433,718 S | 11/2000 | Mcgreen |
| 6,158,752 A | 12/2000 | Kay |
| D435,873 S | 1/2001 | Lee |
| D435,874 S | 1/2001 | Cheng |
| 6,179,307 B1 | 1/2001 | Mao |
| 6,189,898 B1 | 2/2001 | Benoit |
| D438,911 S | 3/2001 | Chen |
| D438,912 S | 3/2001 | Barrera |
| D439,623 S | 3/2001 | Barrera |
| 6,199,652 B1 | 3/2001 | Mastroianni et al. |
| 6,206,387 B1 | 3/2001 | Tsai |
| 6,206,388 B1 | 3/2001 | Ouboter |
| 6,227,324 B1 | 5/2001 | Sauve |
| 6,234,501 B1 | 5/2001 | Chen |
| 6,241,264 B1 | 6/2001 | Page |
| D444,824 S | 7/2001 | Udwin et al. |
| D445,145 S | 7/2001 | Yang |
| D446,259 S | 8/2001 | Udwin et al. |
| D447,187 S | 8/2001 | Powers |
| D447,188 S | 8/2001 | Lan |
| 6,270,095 B1 | 8/2001 | Chang |
| 6,273,205 B1 | 8/2001 | Tsai |
| 6,283,485 B1 | 9/2001 | Tsai |
| 6,286,632 B1 | 9/2001 | Chai |
| 6,286,843 B1 | 9/2001 | Lin |
| 6,296,082 B1 | 10/2001 | Tsai |
| 6,298,952 B1 | 10/2001 | Tsai |
| 6,299,186 B1 | 10/2001 | Kao et al. |
| 6,302,415 B1 | 10/2001 | Wang et al. |
| D450,355 S | 11/2001 | Chan |
| D452,284 S | 12/2001 | McGinnis |

(56) References Cited

U.S. PATENT DOCUMENTS

| | | |
|---|---|---|
| D453,198 S | 1/2002 | Dudley |
| D453,804 S | 2/2002 | Robinson |
| 6,345,678 B1 | 2/2002 | Chang |
| 6,345,827 B1 | 2/2002 | Benoit |
| D454,377 S | 3/2002 | Hsu et al. |
| 6,352,270 B1 | 3/2002 | Wu |
| D456,460 S | 4/2002 | Tseng |
| 6,378,880 B1 | 4/2002 | Lin |
| 6,382,366 B1 | 5/2002 | Chang |
| 6,386,330 B1 | 5/2002 | Wei |
| 6,394,213 B1 | 5/2002 | Tsai |
| 6,406,039 B1 | 6/2002 | Chen |
| 6,409,190 B1 | 6/2002 | Tsai |
| D459,761 S | 7/2002 | Chen |
| 6,416,060 B1 | 7/2002 | Chen |
| 6,416,063 B1 | 7/2002 | Stillinger et al. |
| 6,428,021 B1 | 8/2002 | Tung |
| 6,428,050 B1 | 8/2002 | Brandley et al. |
| 6,431,568 B1 * | 8/2002 | McCleese ............ A63C 17/014 280/11.223 |
| 6,435,528 B1 | 8/2002 | Tsai |
| 6,443,470 B1 | 9/2002 | Ulrich et al. |
| D464,379 S | 10/2002 | Lin |
| 6,462,493 B2 | 10/2002 | Lan |
| 6,467,560 B1 | 10/2002 | Anderson |
| 6,481,728 B2 | 11/2002 | Chen |
| 6,481,729 B2 | 11/2002 | Herman et al. |
| 6,481,913 B2 | 11/2002 | Chen |
| D468,236 S | 1/2003 | Pollitzer et al. |
| D471,597 S | 3/2003 | Chen |
| D471,598 S | 3/2003 | Chen |
| 6,533,054 B1 | 3/2003 | Fey |
| D472,596 S | 4/2003 | Schnuckle et al. |
| D473,905 S | 4/2003 | Schnuckle et al. |
| D475,093 S | 5/2003 | Furter et al. |
| 6,557,861 B2 | 5/2003 | Saylor |
| 6,557,873 B2 | 5/2003 | Nardone |
| 6,604,593 B1 | 8/2003 | Mullet |
| 6,612,592 B1 | 9/2003 | Soo |
| 6,619,416 B2 | 9/2003 | Lan |
| 6,619,679 B2 | 9/2003 | Lan |
| D482,750 S | 11/2003 | Magerer et al. |
| 6,672,607 B2 | 1/2004 | Chung |
| 6,676,138 B1 | 1/2004 | Rosso |
| 6,679,505 B2 | 1/2004 | Yang |
| D486,532 S | 2/2004 | Christianson |
| 6,739,421 B1 | 5/2004 | Miya |
| D492,367 S | 6/2004 | Dennis |
| 6,796,394 B1 | 9/2004 | Lin |
| D497,397 S | 10/2004 | Sramek |
| 6,832,660 B2 | 12/2004 | Dodd |
| 6,863,283 B1 * | 3/2005 | Houston ................ A63C 17/16 280/11.225 |
| D505,469 S | 5/2005 | Joung et al. |
| D513,629 S | 1/2006 | Sramek |
| 6,981,711 B2 | 1/2006 | Seta |
| D516,132 S | 2/2006 | Sramek |
| 7,007,977 B1 | 3/2006 | Gallagher |
| D527,536 S | 9/2006 | Mcoy |
| 7,150,461 B2 | 12/2006 | Schnuckle et al. |
| 7,156,405 B1 | 1/2007 | Ming |
| 7,163,210 B1 | 1/2007 | Rehkemper et al. |
| 7,204,330 B1 | 4/2007 | Lauren |
| 7,214,337 B2 | 5/2007 | Grande |
| 7,226,063 B2 | 6/2007 | Paddock |
| 7,232,139 B2 | 6/2007 | Cole |
| 7,351,265 B2 | 4/2008 | Vitale et al. |
| D569,447 S | 5/2008 | Thomas |
| D574,296 S | 8/2008 | Keski-Luopa |
| 7,419,171 B1 | 9/2008 | Ka |
| 7,431,110 B2 | 10/2008 | Greenwood et al. |
| D579,987 S | 11/2008 | Hong |
| D581,991 S | 12/2008 | Armand et al. |
| 7,584,974 B2 | 9/2009 | Jackman et al. |
| D603,463 S | 11/2009 | Jessie, Jr. |
| 7,610,972 B2 | 11/2009 | Adams et al. |
| 7,654,356 B2 | 2/2010 | Wu |
| D623,701 S | 9/2010 | Dalgard et al. |
| 7,900,731 B2 | 3/2011 | McKinzie |
| 7,976,035 B2 | 7/2011 | Chan |
| 7,980,567 B2 | 7/2011 | Yu et al. |
| 7,988,159 B2 | 8/2011 | Chen |
| D645,522 S | 9/2011 | Powers et al. |
| 8,025,300 B1 | 9/2011 | Jordan |
| D654,963 S | 2/2012 | Powers et al. |
| D656,560 S | 3/2012 | Patterson et al. |
| 8,146,947 B2 | 4/2012 | Hadley |
| 8,186,693 B2 | 5/2012 | Kortschot |
| 8,251,377 B2 | 8/2012 | Green et al. |
| 8,292,018 B2 | 10/2012 | Huang |
| 8,292,308 B2 | 10/2012 | Green et al. |
| D671,600 S | 11/2012 | Horne |
| D672,400 S | 12/2012 | Pizzi |
| 8,348,284 B2 | 1/2013 | Green |
| D678,124 S | 3/2013 | Canni et al. |
| D681,759 S | 5/2013 | Treadway et al. |
| D684,217 S | 6/2013 | Hadley |
| D686,674 S | 7/2013 | Hadley et al. |
| 8,490,985 B2 | 7/2013 | Landau |
| D687,499 S | 8/2013 | Horne |
| D691,671 S | 10/2013 | Chen et al. |
| D692,963 S | 11/2013 | Radtke et al. |
| D693,414 S | 11/2013 | Hadley et al. |
| D695,644 S | 12/2013 | Timonen |
| D698,868 S | 2/2014 | Chan |
| 8,668,039 B2 | 3/2014 | Tuli |
| 8,672,074 B2 | 3/2014 | Ganeous |
| 8,684,121 B2 | 4/2014 | Treadway |
| 8,727,359 B2 | 5/2014 | Green |
| D710,949 S | 8/2014 | Huang |
| 8,813,892 B2 | 8/2014 | Hadley et al. |
| D714,396 S | 9/2014 | Talios |
| D715,870 S | 10/2014 | Talios |
| 8,851,215 B2 | 10/2014 | Goto |
| 8,870,200 B2 | 10/2014 | Chen |
| D717,881 S | 11/2014 | Radtke et al. |
| 8,925,935 B2 | 1/2015 | Powers et al. |
| 8,985,602 B2 | 3/2015 | Chan |
| D727,833 S | 4/2015 | Talios et al. |
| 9,027,690 B2 | 5/2015 | Chavand |
| 9,045,189 B2 | 6/2015 | Lovley, II et al. |
| 9,056,241 B2 | 6/2015 | Green |
| D736,324 S | 8/2015 | Lu et al. |
| 9,114,821 B1 | 8/2015 | Xu |
| D738,435 S | 9/2015 | O'Connell |
| D741,969 S | 10/2015 | Green |
| D748,738 S | 2/2016 | Hadley et al. |
| D750,180 S | 2/2016 | Edlauer |
| 9,321,504 B2 | 4/2016 | Hadley et al. |
| D755,899 S | 5/2016 | Castrucci et al. |
| D756,464 S | 5/2016 | Edlauer |
| D756,465 S | 5/2016 | Byrne et al. |
| 9,339,720 B2 | 5/2016 | Kortschot |
| D764,615 S | 8/2016 | Treadway et al. |
| 9,452,345 B2 | 9/2016 | Doerksen et al. |
| D772,990 S | 11/2016 | Allais |
| D774,145 S | 12/2016 | Hadley et al. |
| D774,601 S | 12/2016 | Mizrahi et al. |
| D777,844 S | 1/2017 | Connell |
| D778,806 S | 2/2017 | Welford |
| 9,592,876 B2 | 3/2017 | Lovley, II et al. |
| 9,616,318 B2 | 4/2017 | Rogers |
| 9,630,085 B2 | 4/2017 | Treadway et al. |
| 9,660,500 B2 | 5/2017 | Huang |
| 9,682,309 B2 | 6/2017 | Huang |
| 9,764,218 B2 | 9/2017 | Treadway et al. |
| 9,808,705 B2 | 11/2017 | Treadway et al. |
| D806,176 S | 12/2017 | Peng |
| D810,623 S | 2/2018 | Adcock |
| D810,836 S | 2/2018 | Hadley |
| D811,489 S | 2/2018 | Hadley et al. |
| 9,919,200 B2 | 3/2018 | Mo |
| D815,215 S | 4/2018 | Desberg |
| 9,950,244 B1 | 4/2018 | Sargis |

(56) References Cited

U.S. PATENT DOCUMENTS

| | | |
|---|---|---|
| D817,228 S | 5/2018 | Kroll et al. |
| D818,541 S | 5/2018 | Huang |
| 9,956,473 B2 | 5/2018 | Chiu |
| 9,987,547 B2 | 6/2018 | Ruschkowski |
| D824,805 S | 8/2018 | Karka |
| 10,071,303 B2 | 9/2018 | Pikulski |
| D829,826 S | 10/2018 | Liu et al. |
| D830,468 S | 10/2018 | Liu |
| 10,099,745 B2 | 10/2018 | Hadley et al. |
| D834,097 S | 11/2018 | Lin et al. |
| 10,124,851 B2 | 11/2018 | Lovley, II et al. |
| 10,137,356 B2 | 11/2018 | Kortschot |
| D836,727 S | 12/2018 | Wilson et al. |
| 10,144,480 B2 | 12/2018 | Tan et al. |
| D837,303 S | 1/2019 | Desberg |
| D839,358 S | 1/2019 | Cao |
| D839,359 S | 1/2019 | Hadley |
| 10,189,533 B2 | 1/2019 | Lovley, II et al. |
| D842,409 S | 3/2019 | Novick |
| D842,758 S | 3/2019 | Hall et al. |
| D849,153 S | 5/2019 | Zhang et al. |
| D849,601 S | 5/2019 | Li et al. |
| D855,115 S | 7/2019 | Yan |
| D858,646 S | 9/2019 | Yang |
| D861,538 S | 10/2019 | Frahm |
| D866,675 S | 11/2019 | Desberg |
| D872,192 S | 1/2020 | Hadley |
| D873,349 S | 1/2020 | Huang |
| 10,737,743 B2 | 8/2020 | Hadley et al. |
| D901,595 S | 11/2020 | Chen |
| D905,794 S | 12/2020 | Liu et al. |
| D910,121 S | 2/2021 | Liu et al. |
| D910,766 S | 2/2021 | Hadley |
| D911,455 S | 2/2021 | Huang |
| D912,180 S | 3/2021 | Desberg et al. |
| D914,102 S | 3/2021 | Hadley et al. |
| 10,933,299 B2 | 3/2021 | Zhang et al. |
| D916,985 S | 4/2021 | Wu et al. |
| D921,765 S | 6/2021 | Ostergaard |
| D923,715 S | 6/2021 | Wang et al. |
| 11,033,799 B2 | 6/2021 | Kortschot |
| 11,038,235 B2 | 6/2021 | Ye |
| 11,084,550 B2 | 8/2021 | Aguilar Ruelas et al. |
| D936,151 S | 11/2021 | Lisle et al. |
| D936,152 S | 11/2021 | Yao et al. |
| D936,750 S | 11/2021 | Wu et al. |
| D940,251 S | 1/2022 | Wang et al. |
| D941,928 S | 1/2022 | Hadley |
| D941,929 S | 1/2022 | Hadley |
| D941,930 S | 1/2022 | Hadley |
| D949,748 S | 4/2022 | Lu |
| 11,305,830 B2 | 4/2022 | Bartolotta et al. |
| 11,338,883 B2 | 5/2022 | Hadley et al. |
| D957,532 S | 7/2022 | Wang et al. |
| D958,257 S | 7/2022 | Cai et al. |
| D964,473 S | 9/2022 | Lu |
| D972,040 S | 12/2022 | Lisle et al. |
| D976,333 S | 1/2023 | Chen et al. |
| D977,018 S | 1/2023 | Lu |
| 11,565,169 B2 | 1/2023 | Kortschot |
| D977,602 S | 2/2023 | Desberg et al. |
| 11,697,469 B2 | 7/2023 | Desberg et al. |
| 11,697,470 B1 | 7/2023 | Wang |
| 11,707,666 B2 | 7/2023 | Zhang et al. |
| D995,651 S | 8/2023 | Hadley |
| D995,652 S | 8/2023 | Hadley |
| D1,010,013 S | 1/2024 | Hadley |
| D1,020,912 S | 4/2024 | Desberg et al. |
| 11,975,794 B2 | 5/2024 | Huang |
| D1,029,949 S | 6/2024 | Huang et al. |
| 12,011,654 B2 | 6/2024 | Desberg et al. |
| D1,039,060 S | 8/2024 | Hadley |
| 12,054,221 B2 | 8/2024 | Hadley et al. |
| 2001/0030405 A1 | 10/2001 | Wu et al. |
| 2002/0005309 A1 | 1/2002 | Patmont et al. |
| 2002/0066610 A1 | 6/2002 | Tsai |
| 2002/0067014 A1 | 6/2002 | Heringer et al. |
| 2002/0074756 A1 | 6/2002 | Tsai |
| 2002/0079662 A1 | 6/2002 | Lee |
| 2002/0079855 A1 | 6/2002 | Parks |
| 2002/0093161 A1 | 7/2002 | Udwin et al. |
| 2002/0096843 A1 | 7/2002 | Wei |
| 2002/0096850 A1 | 7/2002 | Lu |
| 2002/0105152 A1 | 8/2002 | Miller |
| 2002/0108798 A1 | 8/2002 | Huntsberger et al. |
| 2002/0109313 A1 | 8/2002 | Johnsen |
| 2002/0117825 A1 | 8/2002 | Ho |
| 2002/0134604 A1 | 9/2002 | Lan |
| 2002/0140194 A1 | 10/2002 | Shaw |
| 2002/0145264 A1 | 10/2002 | Hung |
| 2002/0149165 A1 | 10/2002 | Lin |
| 2002/0158437 A1 | 10/2002 | Carbonero |
| 2002/0167146 A1 | 11/2002 | Chang |
| 2002/0170763 A1 | 11/2002 | Townsend |
| 2002/0180169 A1 | 12/2002 | Kwok |
| 2003/0020244 A1 | 1/2003 | Sung |
| 2003/0042058 A1 | 3/2003 | Chen |
| 2003/0127816 A1 | 7/2003 | Schnuckle et al. |
| 2003/0168273 A1 | 9/2003 | Ducharme et al. |
| 2003/0221888 A1 | 12/2003 | McKinney, Jr. et al. |
| 2004/0041359 A1 | 3/2004 | Im |
| 2004/0050603 A1 | 3/2004 | Jaeger |
| 2004/0129472 A1 | 7/2004 | Cheng |
| 2004/0217562 A1 | 11/2004 | Haugen et al. |
| 2005/0006859 A1 | 1/2005 | Farrelly et al. |
| 2005/0006866 A1 | 1/2005 | Chen |
| 2005/0012289 A1 | 1/2005 | Wang et al. |
| 2005/0012290 A1 | 1/2005 | McClain |
| 2005/0116430 A1 | 6/2005 | Chen |
| 2005/0121866 A1 | 6/2005 | Kamen et al. |
| 2005/0127629 A1 | 6/2005 | Nelson et al. |
| 2005/0173175 A1 | 8/2005 | Lee |
| 2005/0194759 A1 | 9/2005 | Chen |
| 2005/0229698 A1 | 10/2005 | Beecroft et al. |
| 2006/0049595 A1 | 3/2006 | Crigler et al. |
| 2006/0125200 A1 | 6/2006 | Cole |
| 2006/0279055 A1 | 12/2006 | Morabito |
| 2007/0045976 A1 | 3/2007 | Wu |
| 2007/0126191 A1 | 6/2007 | Kay, III |
| 2008/0197594 A1 | 8/2008 | Ling |
| 2008/0203691 A1 | 8/2008 | Hsu |
| 2009/0071740 A1 | 3/2009 | Palmer |
| 2009/0160150 A1 | 6/2009 | Johnson |
| 2009/0200768 A1 | 8/2009 | Armand et al. |
| 2009/0273152 A1 | 11/2009 | Chung |
| 2009/0321193 A1 | 12/2009 | Jackman et al. |
| 2010/0090422 A1 | 4/2010 | Chan et al. |
| 2010/0123295 A1 | 5/2010 | Landau |
| 2010/0133765 A1 | 6/2010 | Chen |
| 2011/0011657 A1 | 1/2011 | Donnell et al. |
| 2011/0031711 A1 | 2/2011 | Grossman |
| 2011/0056177 A1 | 3/2011 | Goto |
| 2012/0086181 A1 | 4/2012 | Kinnaman |
| 2013/0026734 A1 | 1/2013 | Zhang et al. |
| 2013/0081891 A1 | 4/2013 | Ulmen et al. |
| 2013/0087983 A1 | 4/2013 | Ngai |
| 2013/0186698 A1 | 7/2013 | Sarokhan |
| 2013/0270016 A1 | 10/2013 | Donnell et al. |
| 2013/0282216 A1 | 10/2013 | Edney |
| 2013/0320648 A1 | 12/2013 | Eckert et al. |
| 2014/0090916 A1 | 4/2014 | Lovely, II et al. |
| 2014/0158446 A1 | 6/2014 | Treadway |
| 2014/0332297 A1 | 11/2014 | Kortschot |
| 2015/0196831 A1 | 7/2015 | Treadway et al. |
| 2015/0306511 A1 | 10/2015 | Norman et al. |
| 2015/0352430 A1 | 12/2015 | Treadway et al. |
| 2016/0129963 A1 | 5/2016 | Ying et al. |
| 2016/0213999 A1 | 7/2016 | Treadway et al. |
| 2016/0256767 A1 | 9/2016 | Cerboneschi |
| 2016/0311322 A1 | 10/2016 | Lagant et al. |
| 2016/0318578 A1 | 11/2016 | Heber et al. |
| 2017/0182397 A1 | 6/2017 | Zhang |
| 2017/0182398 A1 | 6/2017 | Garcia Elena |
| 2017/0240239 A1 | 8/2017 | Huang et al. |

(56) References Cited

U.S. PATENT DOCUMENTS

| | | |
|---|---|---|
| 2017/0259162 A1 | 9/2017 | Mo |
| 2018/0015355 A1 | 1/2018 | Desberg et al. |
| 2018/0029659 A1 | 2/2018 | Desberg |
| 2019/0084605 A1 | 3/2019 | Berendzen et al. |
| 2019/0263468 A1 | 8/2019 | Huang |
| 2019/0367116 A1* | 12/2019 | Desberg ............ B62J 43/23 |
| 2020/0307735 A1 | 10/2020 | Paris et al. |
| 2021/0236910 A1 | 8/2021 | Behrmann |
| 2022/0006959 A1 | 1/2022 | Chen et al. |
| 2022/0041243 A1 | 2/2022 | Qiao |
| 2022/0048402 A1 | 2/2022 | Desberg et al. |
| 2022/0204112 A1 | 6/2022 | Sun et al. |
| 2022/0348284 A1 | 11/2022 | Hadley et al. |
| 2023/0127757 A1 | 4/2023 | Lovley, II et al. |
| 2024/0010291 A1 | 1/2024 | Desberg et al. |

FOREIGN PATENT DOCUMENTS

| | | | |
|---|---|---|---|
| CN | 2273210 Y | 1/1998 | |
| CN | 2436196 Y | 6/2001 | |
| CN | 2448414 Y | 9/2001 | |
| CN | 2449767 Y | 9/2001 | |
| CN | 2452873 Y | 10/2001 | |
| CN | 1143702 C | 3/2004 | |
| CN | 2619503 Y | 6/2004 | |
| CN | 2717494 Y | 8/2005 | |
| CN | 2785659 Y | 6/2006 | |
| CN | 2915189 Y | 6/2007 | |
| CN | 200966900 Y | 10/2007 | |
| CN | 204021174 U | 12/2014 | |
| CN | 104787183 | 7/2015 | |
| CN | 104941171 A | 9/2015 | |
| CN | 105148496 A | 12/2015 | |
| CN | 303684781 | 5/2016 | |
| CN | 106422285 A | 2/2017 | |
| CN | 205952205 | 2/2017 | |
| CN | 205952219 U | 2/2017 | |
| CN | 206138715 U | 5/2017 | |
| CN | 108295457 A | 7/2018 | |
| CN | 108325204 A | 7/2018 | |
| CN | 304753393 | 7/2018 | |
| CN | 109927829 | 6/2019 | |
| CN | 305407387 | 10/2019 | |
| CN | 110979533 A | 4/2020 | |
| CN | 210258685 U | 4/2020 | |
| CN | 210618344 U | 5/2020 | |
| CN | 3058861136 | 6/2020 | |
| CN | 111703528 A | 9/2020 | |
| DE | 4424297 A1 * | 1/1996 | ............ A63C 17/01 |
| DE | 201 07 388 U1 | 7/2001 | |
| EP | 0 995 468 | 4/2000 | |
| EP | 3943373 A1 | 1/2022 | |
| GB | 2 441 394 | 9/2008 | |
| GB | 9007711890-0001 | 2/2020 | |
| GB | 8210638000-1000 | 4/2020 | |
| JP | 56085381 | 7/1981 | |
| JP | H06-305476 A | 11/1994 | |
| JP | 2001-225775 A | 8/2001 | |
| JP | 3081197 U | 10/2001 | |
| KR | 200378761 Y1 | 3/2005 | |
| SU | 912584 A1 | 3/1982 | |
| TW | M582478 U | 8/2019 | |
| WO | WO 96/20762 | 7/1996 | |
| WO | WO 2000/03773 | 1/2000 | |
| WO | WO 2002/089933 | 11/2002 | |
| WO | WO 2008/006275 | 1/2008 | |
| WO | WO 2008/019482 | 2/2008 | |
| WO | WO 2015/095368 | 6/2015 | |
| WO | WO 2015/114614 A2 | 8/2015 | |
| WO | WO 2016/128488 | 8/2016 | |
| WO | WO 2017/050247 | 3/2017 | |
| WO | WO 2017/127464 A1 | 7/2017 | |
| WO | WO 2018/013994 | 1/2018 | |
| WO | WO 2018/019156 A1 | 2/2018 | |
| WO | WO 2019/0232248 | 12/2019 | |
| WO | WO 2020/069299 A1 | 4/2020 | |
| WO | WO 2021/073422 A1 | 4/2021 | |
| WO | WO 2022/032136 | 2/2022 | |

OTHER PUBLICATIONS

Https://www.amazon.com/Razor-Turbo-Jetts-Electric-Wheels/dp/BK07H6RB4MX?th=1 (Year: 2018).

Amy Tucker, "We tried both Calgary e-scooter brands Lime and Bird—here's how they compare," Jul. 30, 2019, the star.com, site visited Jan. 23, 2023, https://www.thestar.com/calgary/2019/07/29/we-tried-both-calgary-e-scooter-brands-lime-and-bird-heres-how-they-compare.html, in 3 pages.

Kids Roller Skates—Heel Wheel Roller Skates Attachable Shoe, https://www.amazon.ca/Kids-Roller-Skates-Attachable-Trainer/dp/B08R21VVDJ/, Dec. 19, 2020, in 1 page.

"Razor Electric Hub Motor Scooter Owner's Manual (Kobalt)," Aug. 12, 2020, data2.manualslib.com, site visited Jan. 23, 2023, https://data2.manualslib.com/pdf7/209/20836/20836/2083509-razor/kobalt.pdf?edd92ca8adaa31a5bed07f3ecd24e2e5, in 4 pages.

Razor Jetts Heel Wheels, Purple, One Size, https://www.amazon.ca/Razor-Jetts-Heel-wheels-purple/dp/B073XQJZSX/, Jul. 14, 2017, in 1 page.

"Razor Worldwide," Nov. 11, 2019, facebook.com, site visited Jan. 23, 2023, https://www.facebook.com/RazorWorldwide/photos/2558446474245901, in 1 page.

Tim Nelson and Elizabeth Dunbar, "Electric scooter rentals debut in Twin Cities; Mpls. Eyes regulation," Jul. 10, 2018, mprnews.org, site visited Jan. 23, 2023, https://www.mprnews.org/story/2018/07/10/electric-scooter-rentals-debut-twin-cities-hours-before-mpls-vote, in 1 page.

"Xiaomi M365/PRO/PRO2/1S/3 any voltage hot swappable extra battery," Jun. 8, 2020, youtube.com, site visited Jan. 23, 2023, https://www.youtube.com/watch?v=1cJFdFCtMGI, in 1 page.

"Zag Daily," Aug. 25, 2020, twitter.com, suite visited Jan. 23, 2023, https://mobile.twitter.com/ZagDaily/status/1298193918660694017/photo/1, in 1 page.

* cited by examiner

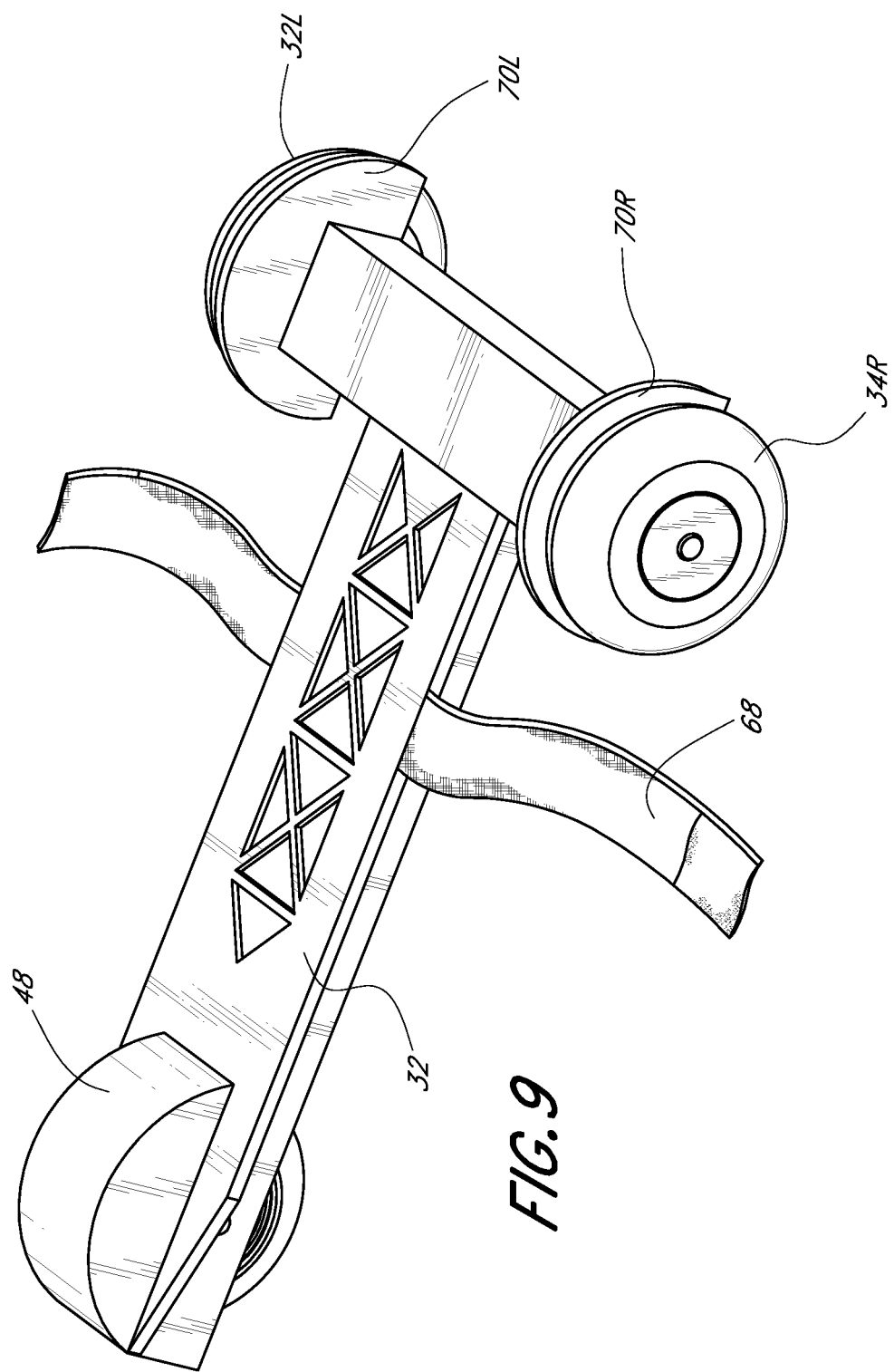

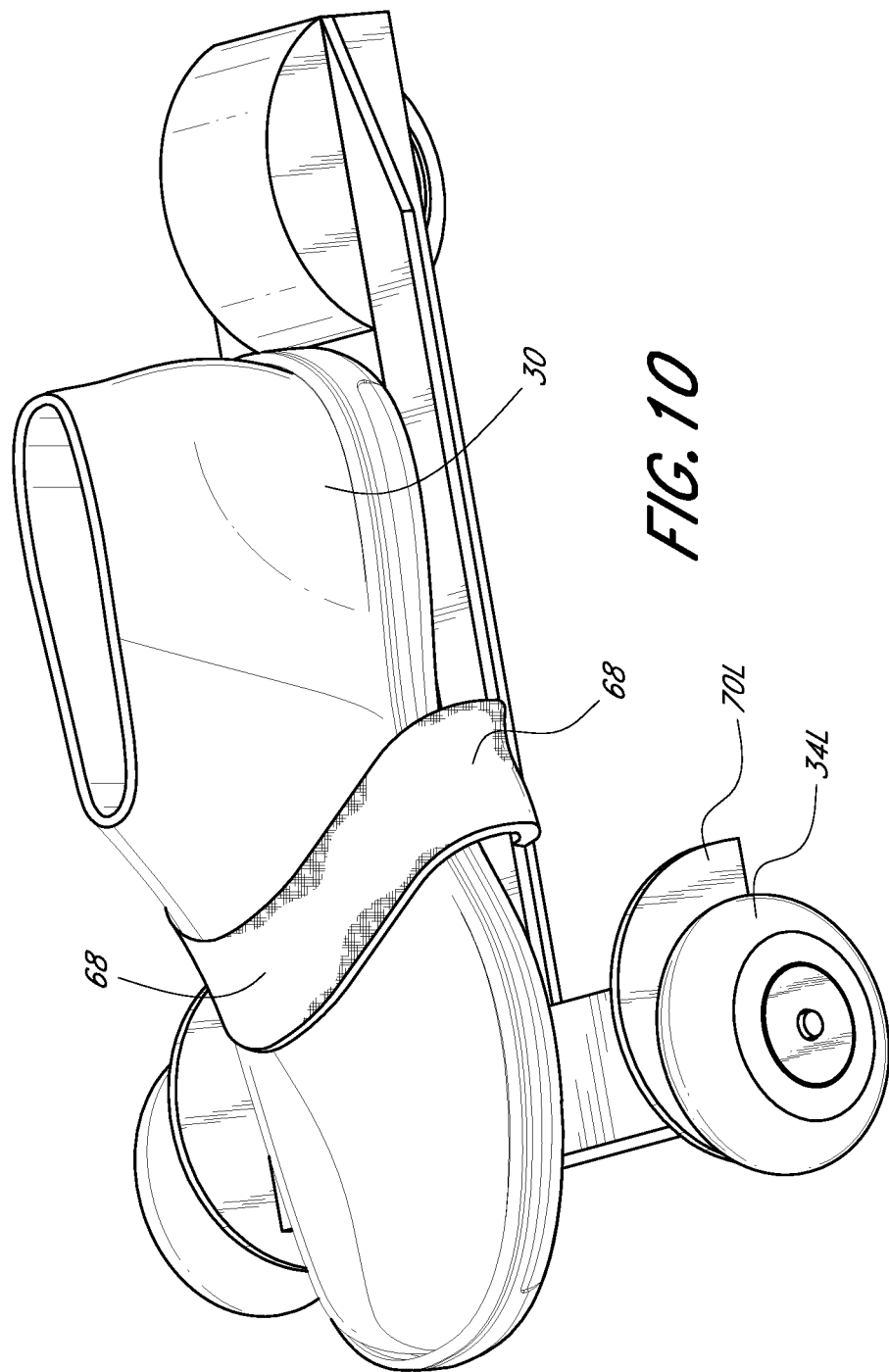

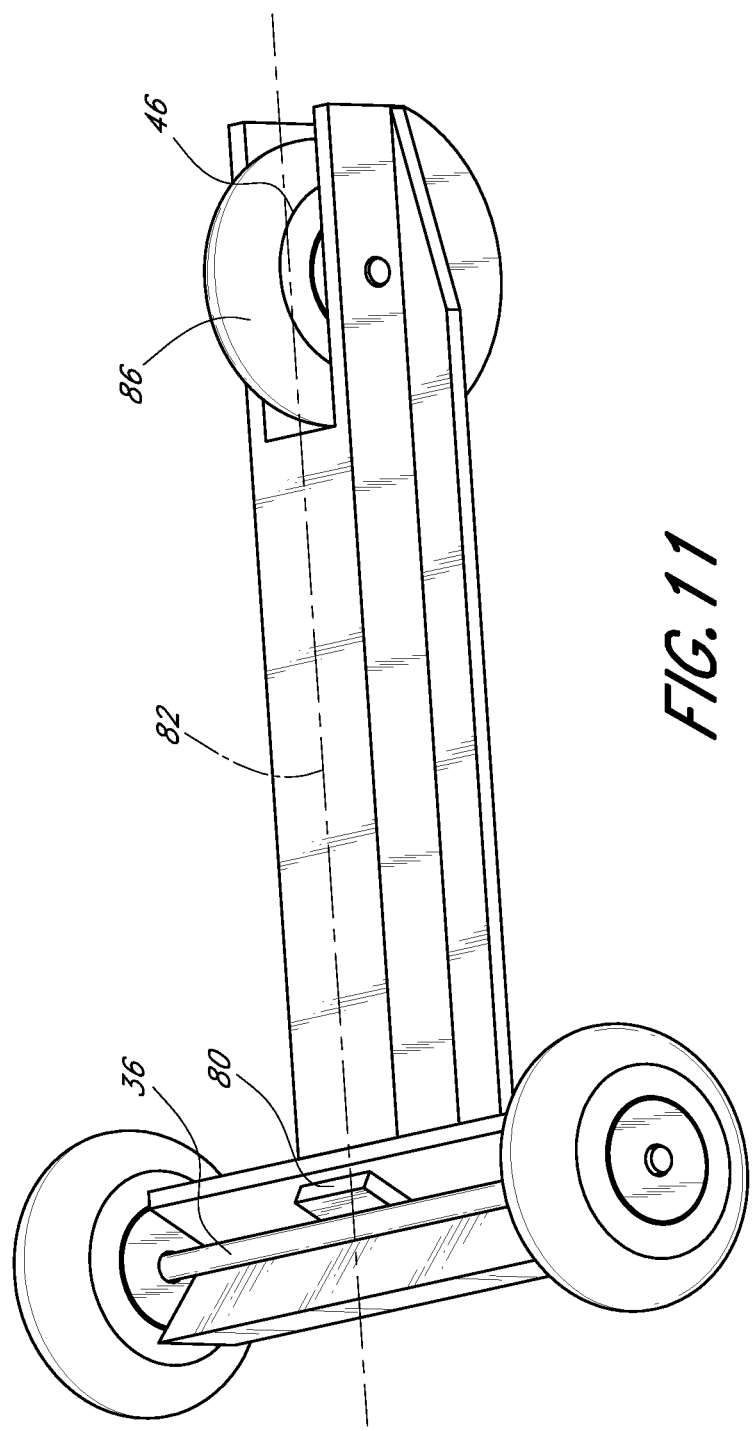

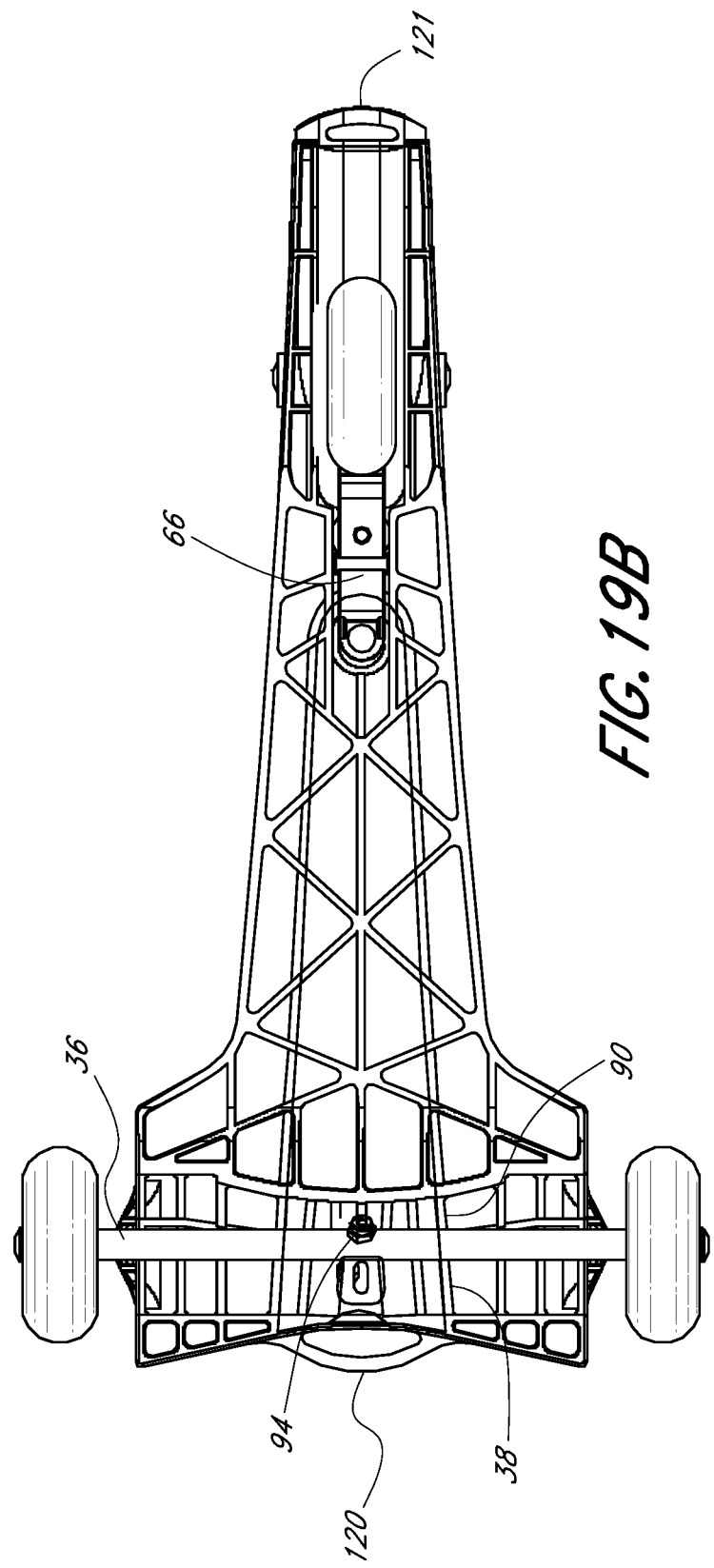

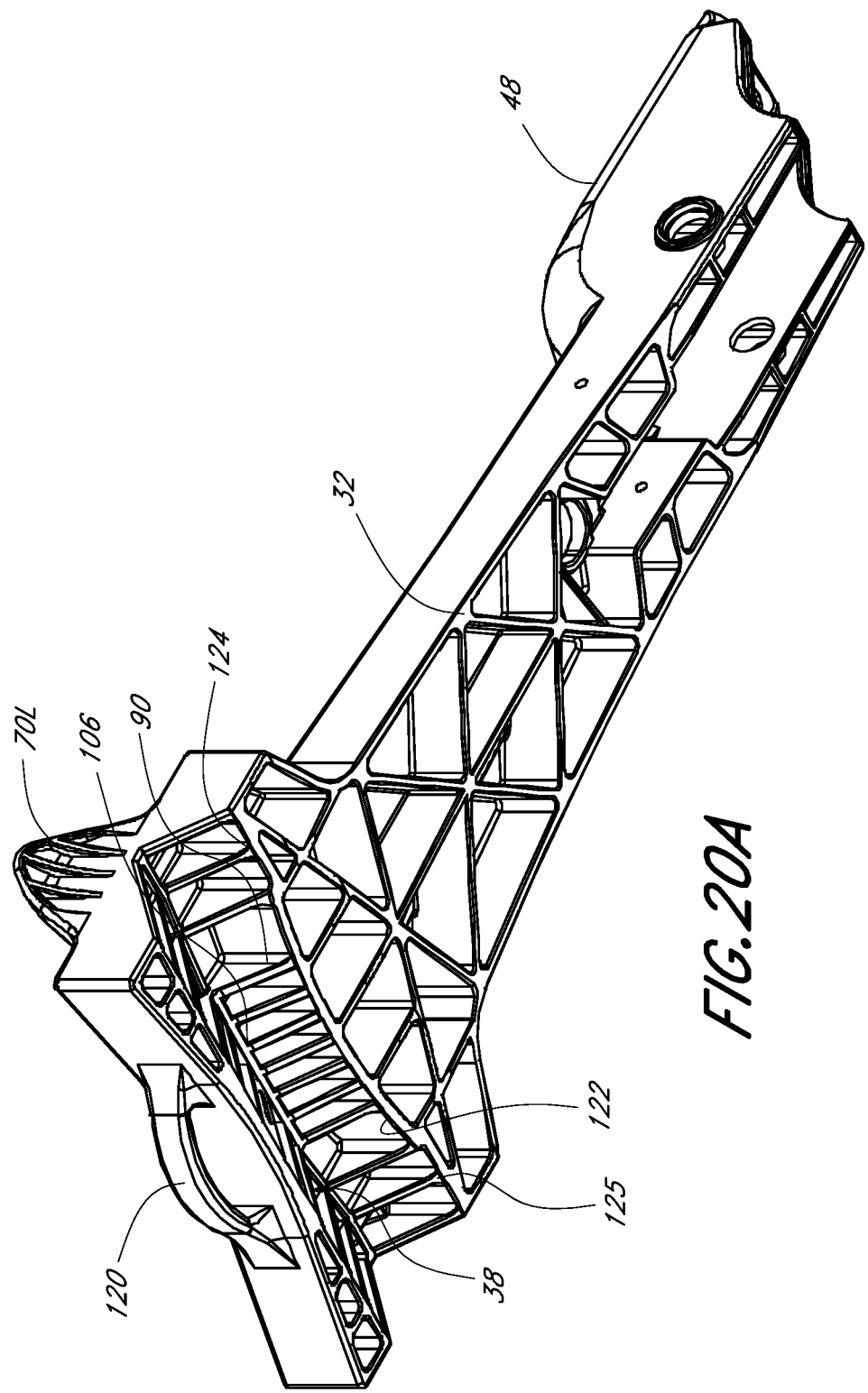

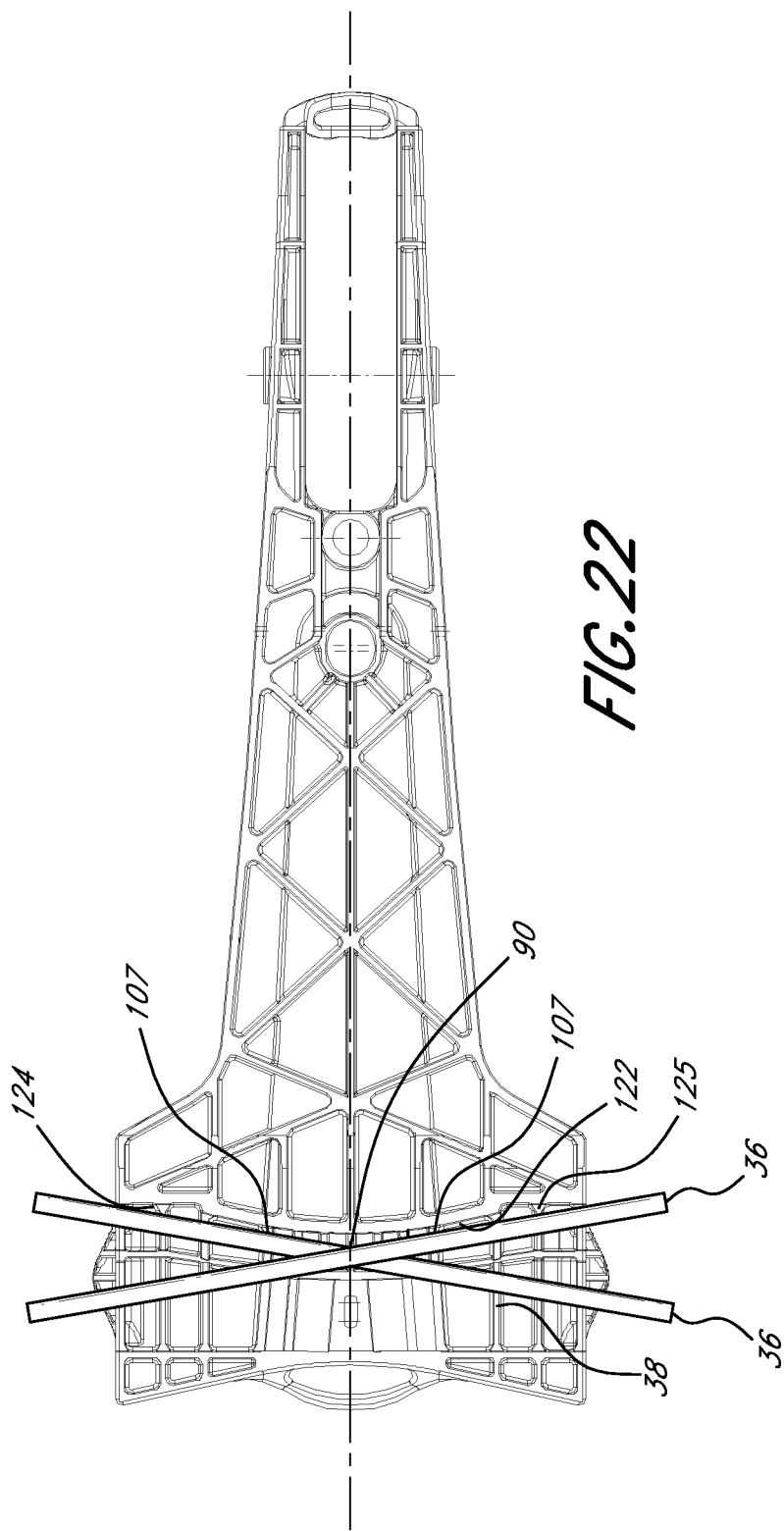

TRANSPORTATION DEVICE WITH PIVOTING AXLE

INCORPORATION BY REFERENCE TO ANY PRIORITY APPLICATIONS

Any and all applications for which a foreign or domestic priority claim is identified in the Application Data Sheet as filed with the present application are hereby incorporated by reference and made a part of the present disclosure.

BACKGROUND OF THE INVENTION

Field of the Invention

The present invention relates to conveyances including skateboards, scooters, roller skates, as well as low profile skateboards, low profile roller skates, and other forms of conveyances. Some embodiments can include skateboards having a unitary platform with one or more inclined planar surfaces that serve as bearing surfaces for steerable axles and wheels.

Description of the Related Art

There is a great deal of prior art describing various human powered platforms that can be turned by tilting the platform about an axis parallel to the direction of travel. For these devices, when the rider tilts the platform from side to side, one or two sets of wheels are induced to turn about an axis which is not parallel with the ground. In this way, skateboarders "lean into the turn in a way that facilitates balance during turns. Both skateboards and roller skates may include this type of tilt-based turning.

In order to mechanically link tilting of the platform with turning of the wheels about a vertical axis, skateboards include a device called a truck. Conventional skateboard trucks are formed from metal or plastic, and are bulky, and usually contain four primary-components: a truck hanger, a base plate, a kingpin, and bushings. These trucks are conventionally located under the horizontal platform that the rider stands on, and the wheels are also usually located underneath the platform. Examples of a conventional skateboard truck include the Randal R-II, or the Destructo Mid Raw 5.0 Skateboard Truck.

In the past, some skateboards have been designed to be used and then conveniently and easily carried with the user when the user is not riding the skateboard. Various features have been designed to meet this portability objective: skateboards that are of low weight, are foldable, are collapsible, or are readily disassembled. However, these skateboards have employed, for the most part, conventional trucks.

Collapsible push scooters including those with lowered platforms are popular. Some of these have relatively short distance between the road surface and top of the riding platform. These scooters are typically made from metal, and although the steering handle collapses and folds, they are still bulky and cumbersome when in their most compact position. There are also a variety of skateboards available with lowered decks so that the rider can push the skateboard more readily.

Therefore there is a need for conveyances with improved steering systems, including those that are lighter, more compact, and assembled from fewer parts.

SUMMARY OF THE INVENTION

Accordingly, in a first aspect, the invention provides a device for transportation comprising a platform comprising a ride surface upon which a rider may place a foot to ride the device in a direction of travel on the ground, so that the ride surface is an upper surface in use, the platform having a length extending in that direction and a forward portion and a rearward portion; a pair of wheels adjacent either the forward portion or the rearward portion and at least one wheel adjacent the other portion; an axle extending between the pair of wheels and located in an axle mounting system attached to the platform; the axle mounting system comprising an axle bearing surface and a pivot member having a pivot surface, the axle bearing surface and the pivot surface being inclined towards each other and each of the axle bearing surface and the pivot surface being inclined with respect to the ride surface, the pivot surface creating a pivot about which the axle can pivot to provide, in use, a turning function for the device and the axle bearing surface extending transversely to said length and providing a surface that supports the axle during said pivoting of the axle and turning of the device. Typically the axle mounting system is attached to and below the platform. Then, the axle bearing surface and pivot surface, in such preferred embodiments, are inclined towards each other towards the platform.

In one embodiment, the axle bearing surface is located or extends adjacent each of the pair of wheels. This is to extend support to just inboard of the wheels, which in some embodiments are outside the perimeter of the foot of a rider. This reduces the bending stresses on the axle, and reduces the weight of the board.

Thus, in one embodiment, the axle bearing surface has a length substantially the same as the length of the portion of the axle between the wheels.

In one embodiment, the pivot member surface opposes the axle bearing surface.

In one embodiment, the pivot member comprises a portion having a substantially triangular cross-section.

In one embodiment, the surface of the pivot member is curved.

In one embodiment, the axle bearing surface comprises a substantially planar portion.

In one embodiment, the axle bearing surface comprises a curved portion.

In one embodiment, the axle bearing surface comprises two or more substantially planar portions.

In one embodiment, the location of the contact portion on the surface of the pivot member changes as the axle pivots about the pivot surface.

In one embodiment, the location of the contact portion on the surface of the pivot member changes as the axle pivots about the pivot member surface, and the contact portions on the surface of the pivot member defined as the axle pivots describe a curve substantially parallel to a vertex of an angle between the surface of the pivot member and the bearing surface.

In one embodiment, the bearing surface is a discontinuous surface.

In one embodiment, the surface of the pivot member is a discontinuous surface.

In one embodiment, the device further comprises a spring or spring like structure contacting the axle, and opposing the axle bearing surface.

In one embodiment, the surface of the pivot member is curved, and the curved surface of the pivot member comprises a portion having a radius of curvature of about 140 to about 170 mm.

In one embodiment, the surface of the pivot member is curved, and the curved surface of the pivot member comprises a central portion having a first radius of curvature, a first outboard portion having a second radius of curvature, and a second outboard portion having a third radius of curvature.

In one embodiment, the surface of the pivot member is curved, and the curved surface of the pivot member comprises a central portion having a first radius of curvature, a first outboard portion having a second radius of curvature, and a second outboard portion having a third radius of curvature, wherein the first radius of curvature is greater than the second or third radii of curvature.

In one embodiment, the surface of the pivot member is curved, and the curved surface of the pivot member comprises a central portion having a first radius of curvature, a first outboard portion having a second radius of curvature, and a second outboard portion having a third radius of curvature, wherein the first radius of curvature is greater than either of the outboard radii, the outboard radii preferably being equal to one another. Typically, the radius of curvature of the curved pivot member, whether as a constant curve, or the average radii of such multiple radii, is about 5 to 10 inches, preferably about 6-8 inches.

In one embodiment, the angle between the pivot member surface and the axle bearing surface is about 70 to about 110°.

In one embodiment, the surface of the pivot member is curved, and the curved surface of the pivot member comprises a central portion having a first radius of curvature, a first outboard portion having a second radius of curvature, and a second outboard portion having a third radius of curvature, wherein the first outboard portion and the second outboard portion are on opposite sides of the central portion.

In one embodiment, the angle between the surface of the pivot member and the bearing surface measured at a central portion of the pivot member is different from the angle measured at an outboard portion of the pivot member.

In one embodiment, the pair of wheels is adjacent the forward portion.

In one embodiment, the pair of wheels is adjacent the rearward portion.

In one embodiment, the platform has a top surface defining a first plane, the axle bearing surface forming an angle with a second plane parallel to the first plane being about 26 to about 45 degrees.

In one embodiment, the platform has a top surface defining a first plane, the axle bearing surface forming an angle with a second plane parallel to the first plane being about 26 to 45 degrees, more preferably about 30 to about 40 degrees.

In another embodiment, a method is presented for turning a transportation device, the method comprising pivoting an axle about a pivot member surface, wherein the pivot member surface contacts the axle and is disposed at an angle to a bearing surface and has a fixed position in relation to the bearing surface, the pivot member surface opposing the bearing surface and the bearing surface slidably contacting the axle, the axle extending between a pair of wheels positioned adjacent a forward portion or rearward portion of a ride surface suitable for placement of a rider's foot thereupon and the ride surface having at least one wheel adjacent the other portion of the ride surface.

In another embodiment, there is provided a device for transportation comprising a platform upon which a rider may place a foot to ride the device in a direction of travel on the ground or similar surface, the platform having a length extending in that direction and a forward portion and a rearward portion; a pair of wheels adjacent either the forward portion or the rearward portion and at least one wheel adjacent the other portion; an axle extending between the pair of wheels and located in an axle mounting system attached to the platform, the axle being configured to pivot on an inclined surface, so that when a user leans to turn he device the platform tilts into the turn direction and the center of the top surface of the platform increases in altitude as the axle moves on the inclined surface to establishes a new position thereon. The inclined axle bearing surface may the other characteristics described herein.

Preferably, the axle mounting system is attached to the underside of the platform.

The device may further comprise a member about which the axle pivots as the axle moves on the inclined surface. The pivot member may a curved surface and/or the other characteristics described herein.

BRIEF DESCRIPTION OF THE DRAWINGS

The invention will be more fully understood from the following detailed description thereof taken in connection with the accompanying drawings, which form part of this application, and in which:

FIG. 9 shows a perspective view of a skateboard an elastic strap 68 fastened to the underside of the platform. It also shows two partial front fenders 70R and 70L that are rigidly fixed to the foot support platform 32 to prevent the rider's foot from contacting the front wheels 34R and 34L.

FIG. 10 shows a perspective view of a skateboard with the elastic strap 68 wrapped around the rider's shoe to held the shoe firmly to the top of the skateboard.

FIG. 11 shows a view of a skateboard truck with an extended pivot member 80, creating a gravity spring to provide forces that tend to restore the axle to the position normal to the centerline 82 of the skateboard.

FIG. 19B is a bottom view of one embodiment showing discontinuous surfaces for the axle bearing surface and the pivot member.

FIG. 20A is an oblique bottom view of one embodiment showing discontinuous axle bearing and pivot member surfaces, vertex, and fenders.

FIG. 22 is a bottom view of the device showing the change in contact portion for different turning positions of the axle.

DETAILED DESCRIPTION OF THE PREFERRED EMBODIMENTS

The following description and examples illustrate some exemplary embodiments of the disclosed invention in detail. Those of skill in the art will recognize that there are numerous variations and modifications of this invention that are encompassed by its scope. Accordingly, the description of a certain exemplary embodiment should not be deemed to limit the scope of the present invention. In addition, the Figures are not to scale and some features may be exaggerated or minimized to show details of particular elements while related elements may have been eliminated to prevent obscuring other aspects.

Generally speaking, the systems described herein are directed to wheeled conveyances including, for example, low profile wheeled conveyances, such as skateboards, scooters, kick scooters and/or roller skates.

Referring to the Figures, some embodiments of the conveyance disclosed herein include a foot support platform 32 having an integral, full-width or partial-width inclined axle bearing surface 38 which supports a transverse axle 36. In one embodiment, the inclined axle bearing surface 38 can be a planar surface and can form an angle of between about 10° and about 70° with the horizontal plane, said plane being defined as parallel to the travel surface depending, for example, on the steering responsiveness required. The axle 38 supports a pair of wheels 34R and 34L. The inclined axle bearing surface 38 supports the axle 36 across all or part of its span between the wheels 34R and. 34L, but in some embodiments, said surface 38 can support the axle 36 in the regions adjacent to the wheels 34R and 34L and can reduce the bending moment applied to the axle.

Figure 17:
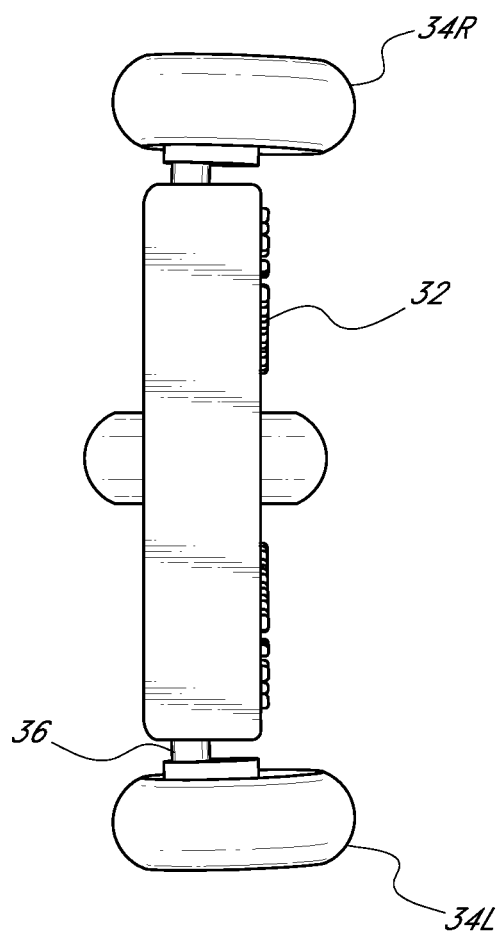
FIG. 17 is a front view of the skateboard showing the relative position of wheels and axle to the foot support platform.

The wheels 34R and 34L can be conventional skateboard or roller skate or in-line skate or scooter wheels or other types of wheels, and in some embodiments a pair of roller or plain bearings, not depicted in these figures, can be located between the solid body of the wheel and the axle. The axle mayor may not rotate about its own longitudinal axis when the skateboard moves, and the wheels rotate. The axle can be offset from the center of the wheel in a vertical and/or horizontal direction, such as is shown in FIG. 17.

The wheels 34R and 34L may be retained at a specific location along the length of the axle 36 by any conventional means commonly used, including those used for skateboard, roller skate, in-line skate, or scooter wheels, but other methods can be used as well. The method of retention is not depicted here.

A pair of compression springs 44R and 44L can be compressed by the axle 36 against a spring bearing surface 39 that can be an integral part or added part of the foot support platform. These springs may be rubber blocks, cell springs, leaf springs or any other type of member capable of supporting compression parallel to the surface of the inclined axle bearing surface 38 and perpendicular to the axle 36. The compression springs serve to restore the axle to a position perpendicular to the long axis of the conveyance 82 (see FIG. 11), when no torque is applied by the user about said axis 82. The compression springs therefore function to keep the conveyance running in a straight line or particular direction unless the user deliberately tilts the conveyance to make a turn or change the direction. In some embodiments, a turning bias can be built into the conveyance, such as by adjustment of the compression springs, the axle bearing surface or the pivot member design or position, such as to correct for an off-balance load, sloped travel surface, etc. or to favor, cause, or build-in a turning condition to the conveyance.

In some embodiments, tension springs can be used in place of or in combination with compression springs. Suitable locations for tension springs include in front of and below the axle instead of the compression springs 44R and 44L. A pivoting axis 43 may be formed by the inclusion of a pivot member 40 formed in the shape of a triangular prism, or some other shape, including those which have a ridge configured to contact the axle.

In some embodiments, springs for different rider weights, ability level, size, or performance can be provided with or separate from the conveyance for tuning the operation of the conveyance, or for other reasons, such as maintenance. In some embodiments, the spring response on operability can be adjusted, such as by including provision to adjust the lateral position of the springs on the spring bearing surface 39.

In some embodiments, a single rear wheel 46 can be supported by an axle 50 inserted through holes or indentations in the foot support platform, and retained by any conventional means. The wheel 46 can be positioned between the platform forks 49R and 49L and retained in an appropriate position by suitable methods including spacers, axle design features (such as interference fit, bumps, indentations, protuberances, etc.), nuts, etc. It is also possible to mold suitable spacers or other suitable features as part of the foot support platform 32.

In other embodiments, a single wheel, similar to that described for the rear can be utilized in the front with a system comprising an axle and inclined axle bearing surface, as described herein, in the rear, or a system comprising an axle and inclined axle bearing surface, as described herein, in both the front and the rear.

A fender 48 can be included as part of a foot support platform to cover a single wheel 46 or a pair of wheels. The fender 48 could be molded as part of a foot support platform in a single molding operation, and can have sufficient rigidity to serve as a rest platform for a rider's ground engaging foot (the "pushing foot"). At the same time, the fender 48 could be designed with sufficient flexibility that it could engage the wheel to serve as a friction brake when a rider's weight was transferred from the front foot to the rear foot to press down substantially on said fender 48.

In some embodiments, fenders can be utilized, such as by molding as part of the foot support platform 32 or otherwise, for example to prevent the rider's foot from engaging the rotating wheels 34R and 34L. Partial front fenders 70R and 70L are shown in FIG. 9 and FIG. 10. In some embodiments, fenders or partial fenders can prevent the axle from being unduly loaded in bending in the event that the user inadvertently stepped on the conveyance while it was upside down on the ground.

Figure 8A:
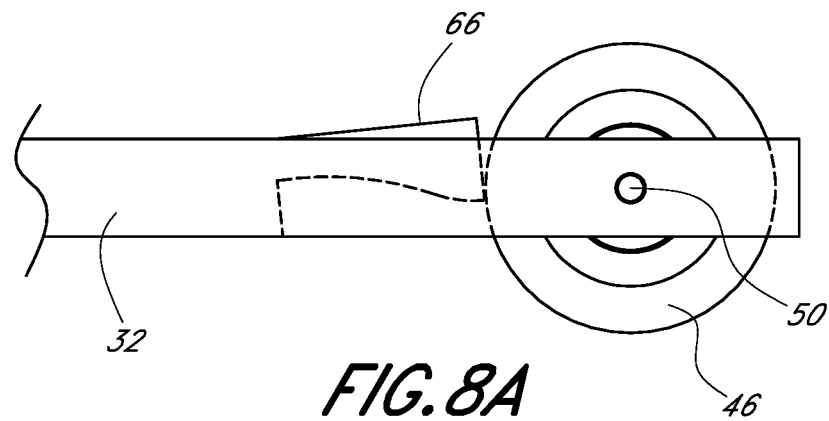
FIG. 8*a* shows a side view of a deadman's brake that is formed as an integral part of the unitary skateboard platform with this brake engaged to contact a wheel to stop the motion of the skateboard.
Figure 8B:
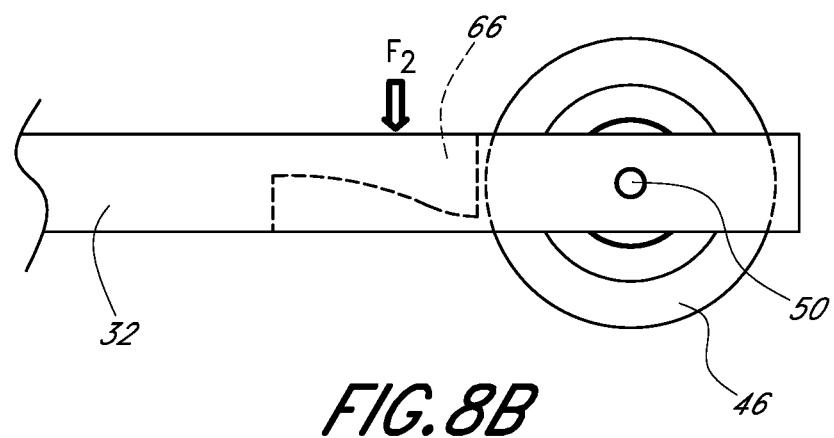
FIG. 8*b* shows a side view of the deadman's brake with the brake disengaged from the wheel by the application of a force F2 to the brake by the application of pressure downward by the user's foot.

An optional deadman's brake assembly can be composed from an angled lever 58, a torsion spring 60 a depression 61 in the foot support platform body 32 and an axle 62. If the user steps-off or falls off the conveyance, the torsion spring 60 presses the rear part of the angled lever 58 against the rear wheel 46 and slows or stops the conveyance Instead of using a torsion spring 60, a compression spring may be inserted between the depression 61 in the foot support platform body 32 and the angled lever 58 to provide the deadman's brake action An alternative version of an optional deadman's brake is formed as an integral part of the foot support platform in order to reduce the number of parts and simplify assembly. For example, the brake 66 can be formed so that in the unstressed state it protrudes above the plane of the conveyance platform 32 and engages the rear wheel 46 as depicted in FIG. 8A. When the rider presses down on the brake 66 with his heel, then the brake shoe 66 disengages from the rear wheel 46 as depicted in FIG. 8B.

Figure 1:
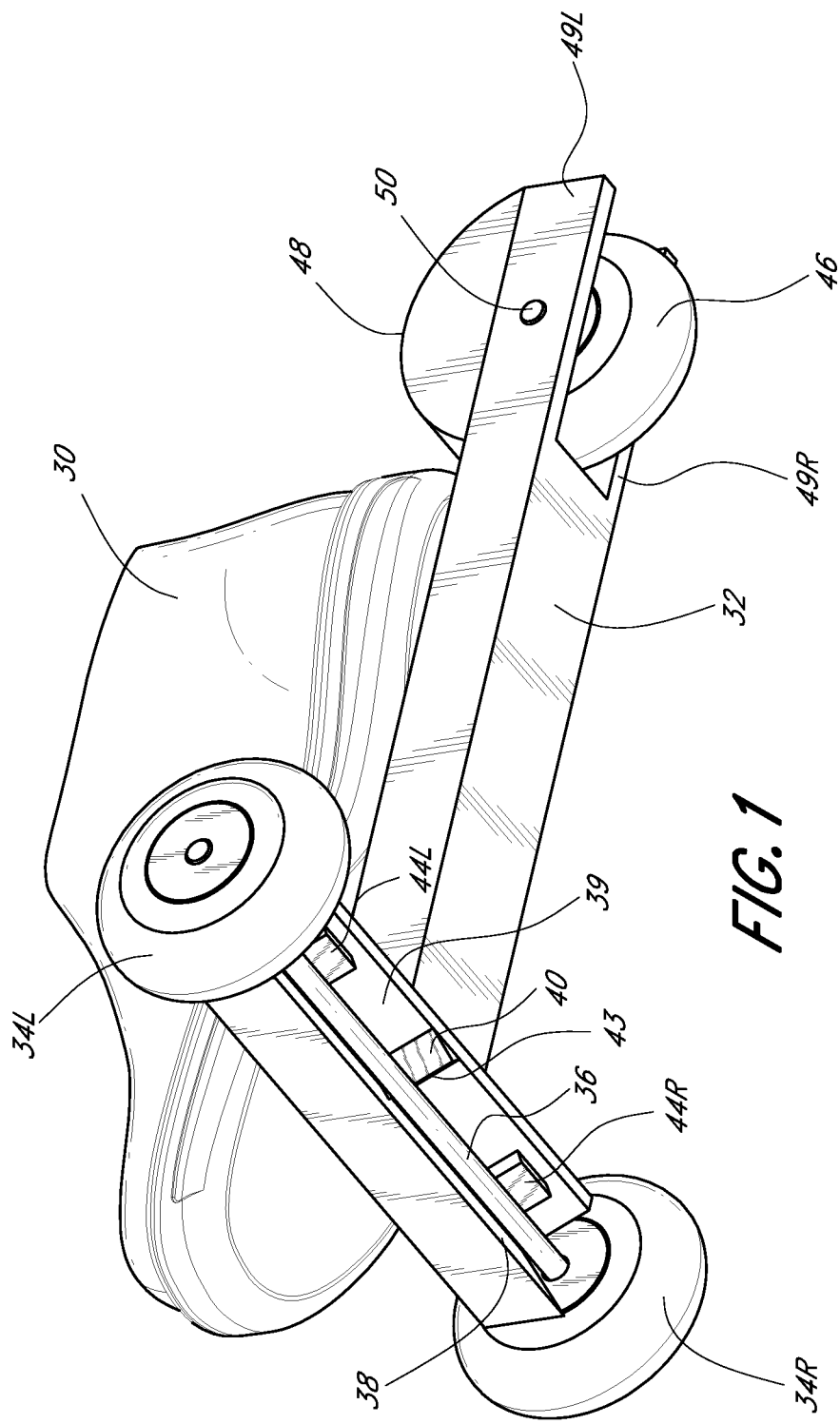
FIG. 1 shows a perspective view of the underside of the skateboard with a rider's shoe placed in the riding position.
Figure 2:
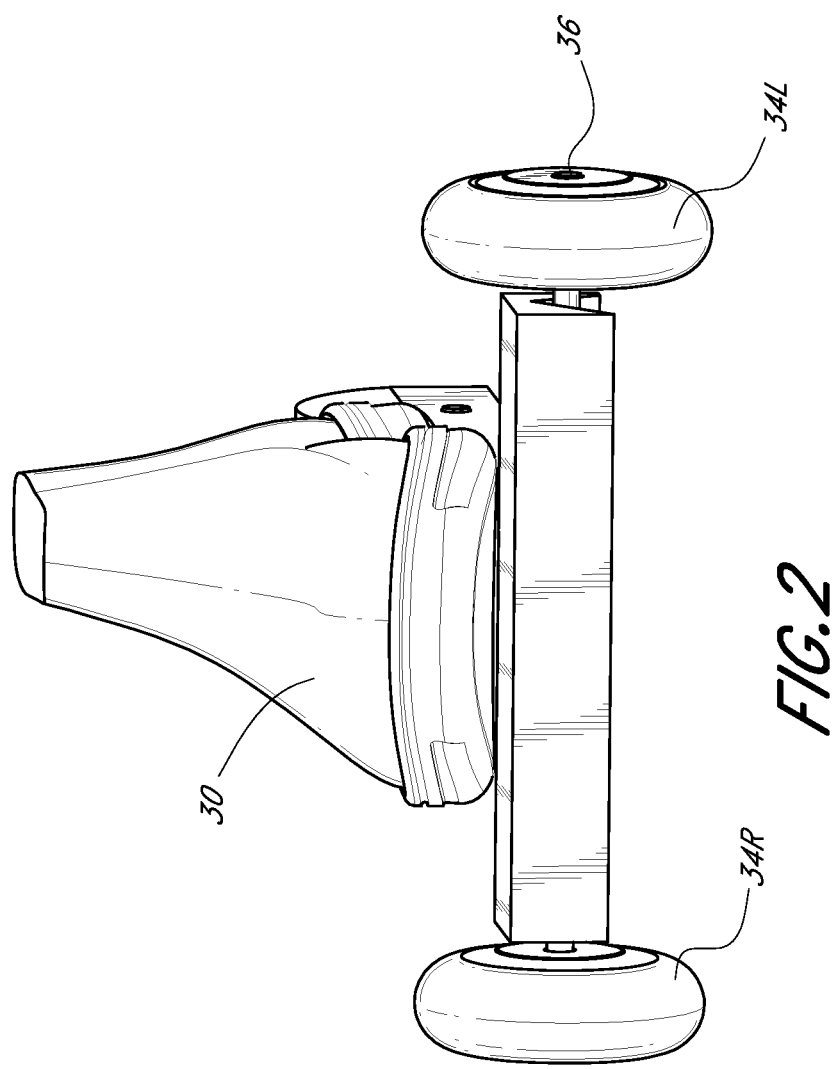
FIG. 2 shows a perspective view of the front of the skateboard with the rider's shoe placed in the riding position.
Figure 13:
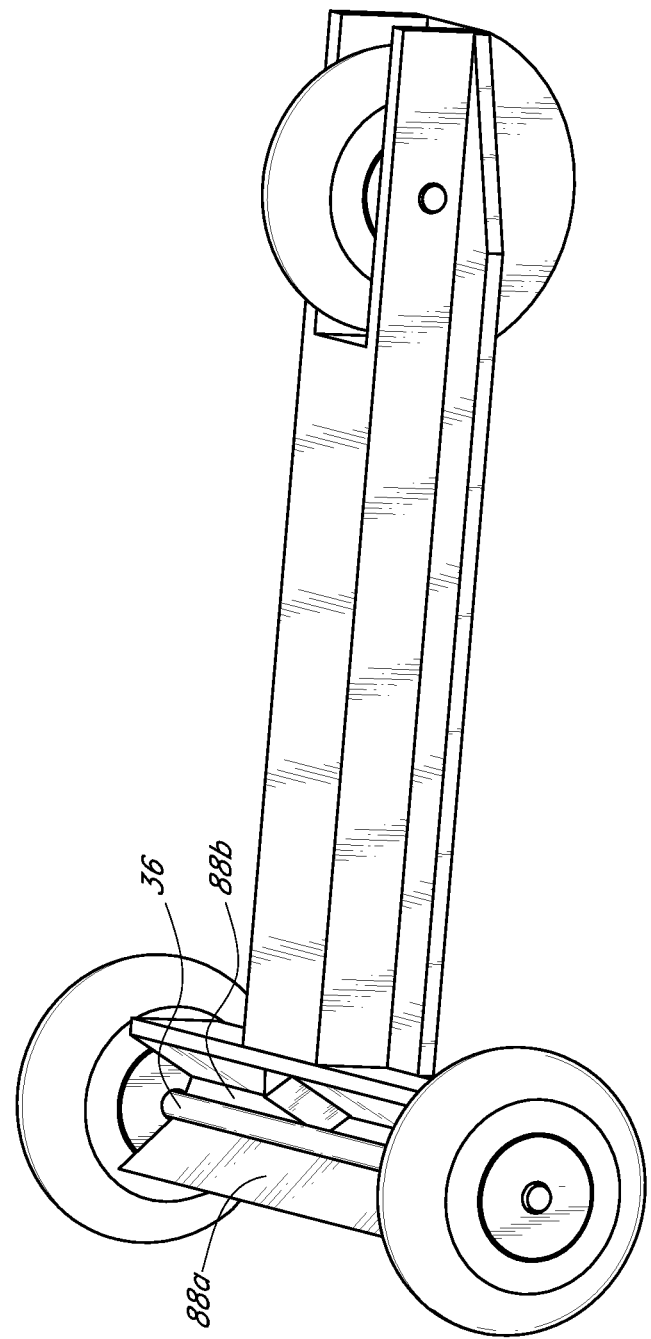
FIG. 13 shows a view of a non-planar inclined axle bearing surface comprising of two parts with differing slopes 88A and 88B.

In some embodiments, an axle bearing surface 38 can be positioned at an angle to a pivot member 40, 80 or 90. The bearing surface can be monoplanar as shown in FIG. 1, or multiplanar or curved, as shown in FIG. 13. In various embodiments, the curved or multiplanar character can be in a direction parallel to the long axis of the axle, at an angle to the long axis of the axle, or both parallel and at an angle to the long axis of the axle. In some embodiments, the axle bearing surface can extend substantially from one end of the axle to the other or from one wheel to the other. In some embodiments, the axle bearing surface can extend for a different distance over the length of the axle, such as 90% of the distance between the ends of the axle or the distance between the wheels, or for about 80% or for about 70% or for about 60% or for about 50% or for about 40% or for about 30% or for about 20% or less. As the extent of the axle bearing surface decreases, the axle can be made stronger, such as through dimensioning of the axle or through the selection of the materials used for the axle. Also, as the extent of the bearing surface decreases, the bearing surface can be made stronger, such as by selection of materials used for its construction. In some embodiments, the axle bearing surface can be removable, such as for replacement due to wear or to change the turning characteristics of the device, or for some other reasons including cosmetic. In some embodiments, the pivot member or its contact surface with the axle can be removable, such as for replacement due to wear or to change the turning characteristics of the device, or for some other reasons including cosmetic. Different shapes as well as materials and material hardness/resilience can be utilized for the bearing surface and the pivot member and pivot member surface, as desired such as for different turning or performance characteristics.

The pivot member 40 can have a narrow contact region for contacting the axle, such as with a triangular cross-section as shown in FIG. 1, or some other shape that presents a narrow or sharp surface to the axle. Suitable other shapes include those having a cross-section related to or including a square, rectangle, pentagon, teardrop, round or other shape. The narrow or sharp surface can also be truncated. In some embodiments, the pivot member can be a protruding portion from another part, such as the foot support platform a base structure, or another part.

Figure 12:
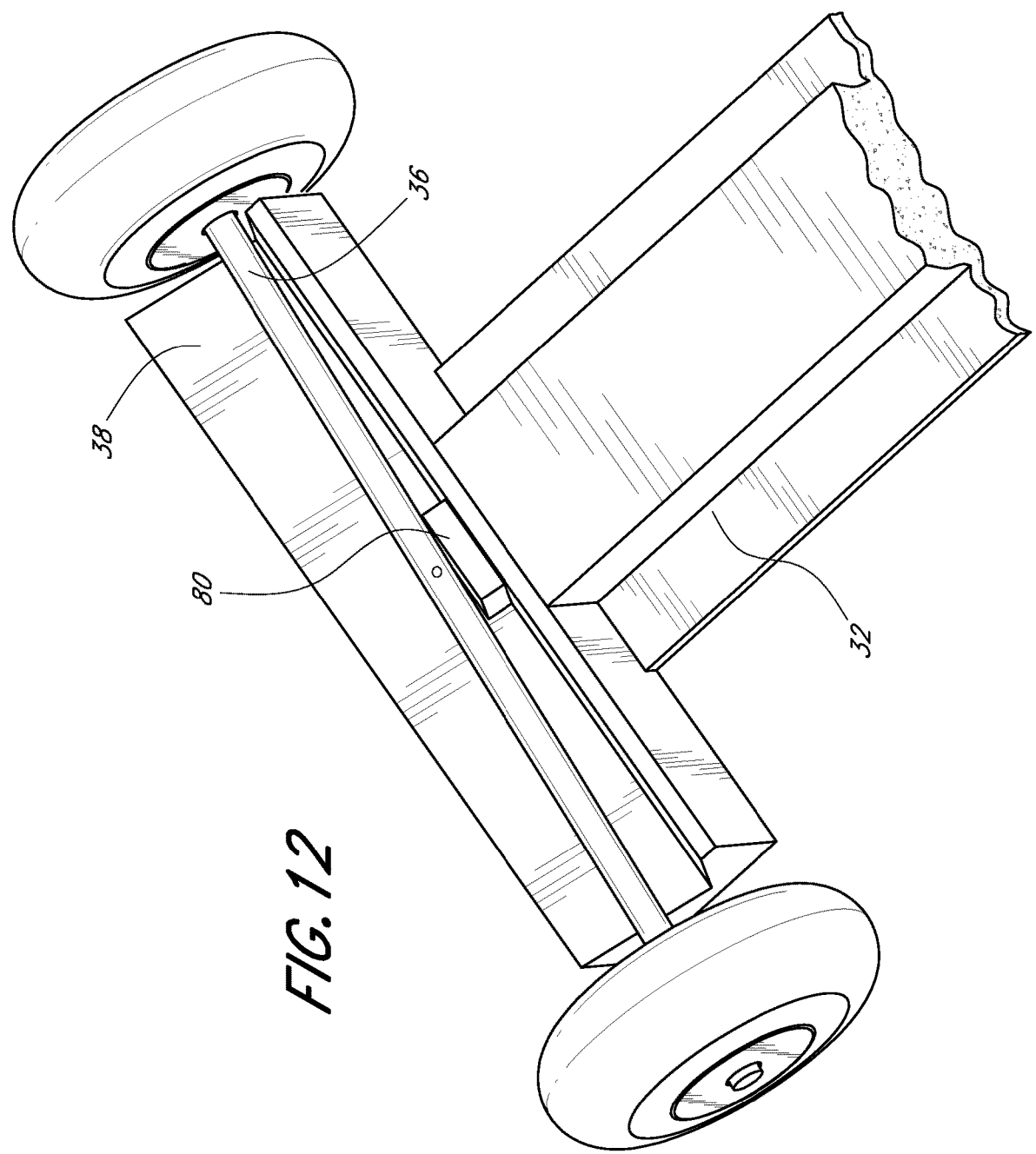
FIG. 12 shows the motion of the axle during a tilt induced turn, with the extended pivot member 80. The point of contact between the axle 36, and the extended pivot member 80 (the "pivot point") shifts towards the wheel on the inside of the turn, where the term "inside" is defined in the conventional way.
Figure 14:
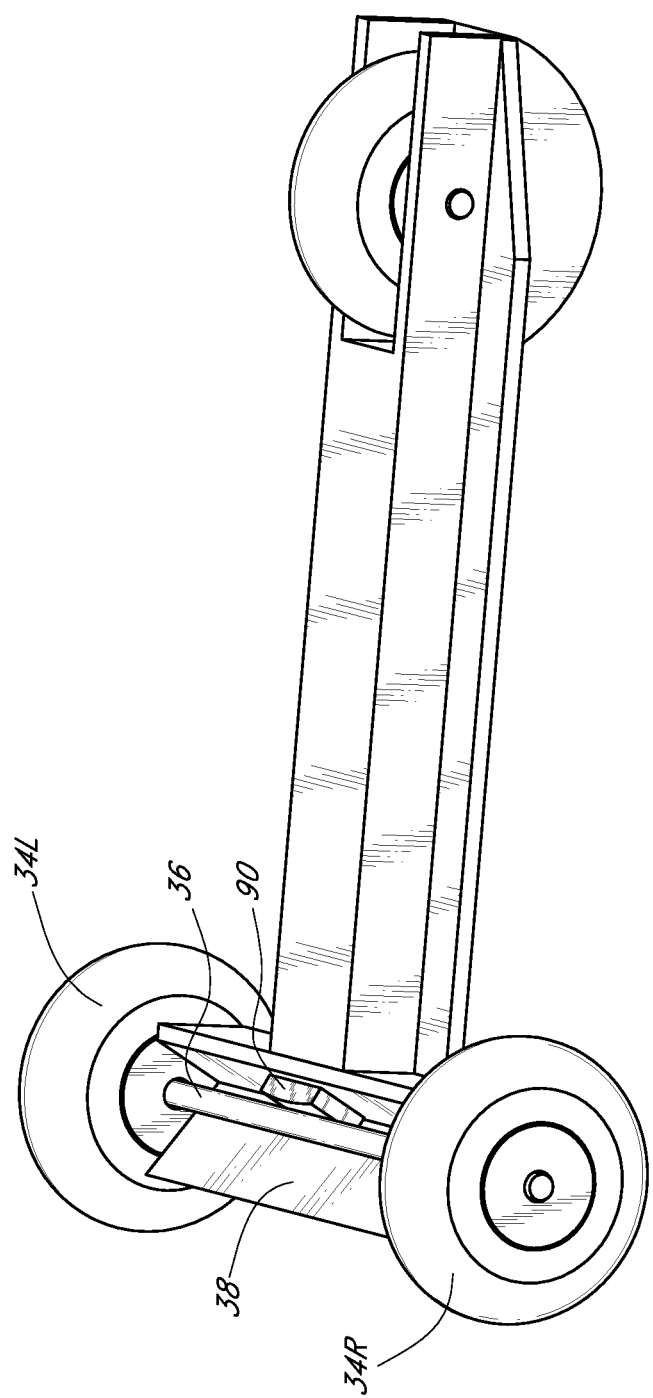
FIG. 14 shows a curved extended pivot member 90.

In one embodiment, as shown in FIG. 11, the pivot member 40 defining a single pivot axis 43 is replaced with an extended pivot member 80. The extended pivot member 80 is shaped so that the point or area of contact between the axle and the pivot member 80 shifts towards the inside of the turn, when the conveyance is tilted as depicted in FIG. 12. A curved version of the extended pivot member 90 is depicted in FIG. 14.

Figure 16:
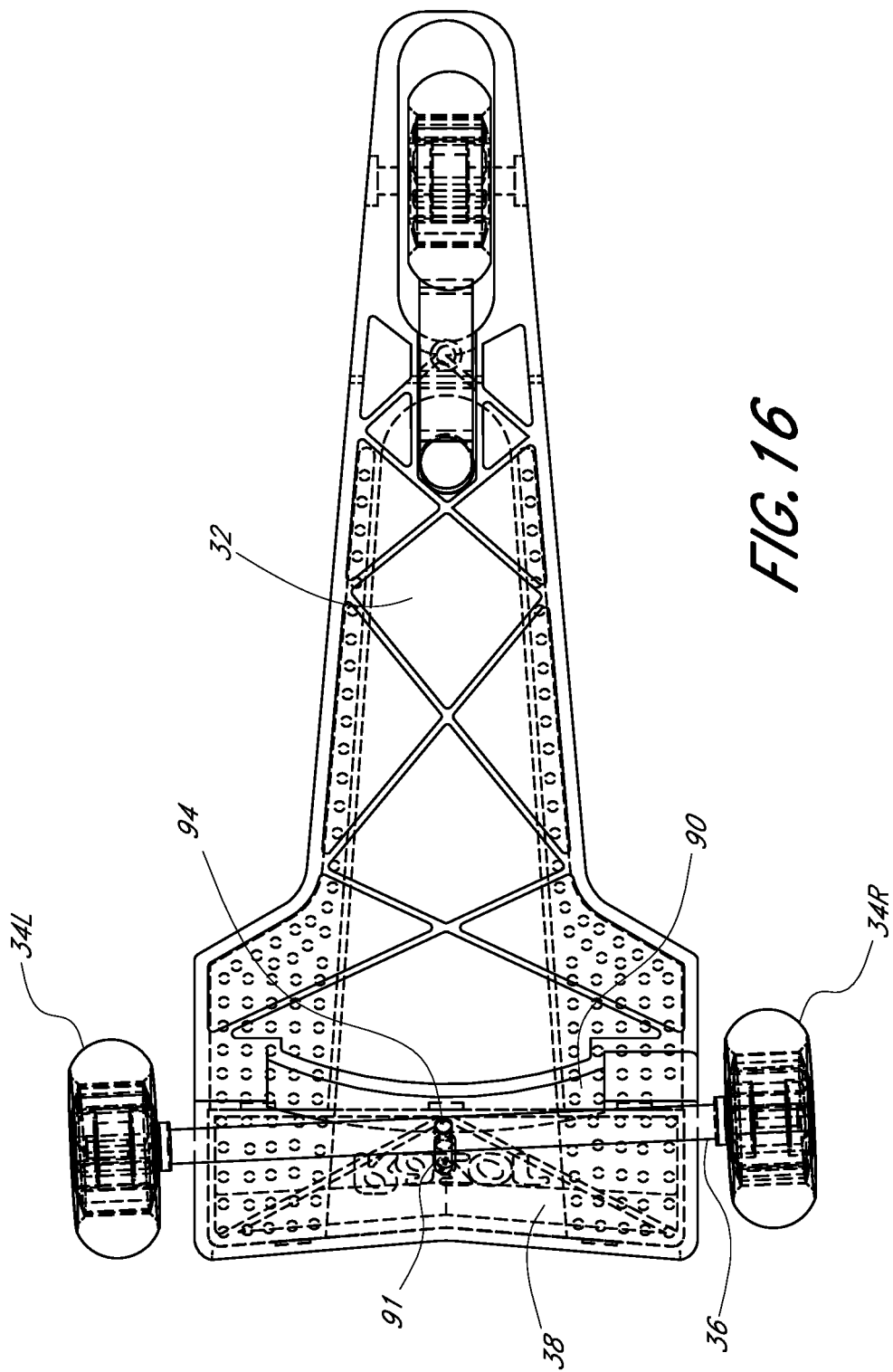
FIG. 16 shows the axle and curved pivot member.

Another version of a curved extended pivot member is shown in FIG. 16, where the extended pivot member 90 has a curved face convex away from one end of the foot support platform. This curved face approaches or intersects the axle bearing surface 38 along a curved line 94, where the ends of the curved line 94 curve upward and toward one end of the foot support platform 32. In some embodiments, the pivot member 90 and the axle bearing surface 38 can be separated somewhat, such as with a gap or an intervening material, wherein the intervening material is flush, protrudes out, or is recessed from the surface of the pivot member 90 and/or the axle bearing surface 38. In operation, when the rider leans or otherwise causes a turn, the foot support platform 32 will tip, with one edge of the foot support platform 32 moving toward the axle 36, and the other edge moving away from the axle 36. As the foot support platform 32 tips, the axle 36 shifts its contact zone 107 with the pivot member 90 to a new zone closer to the edge of the foot support platform on the side where the edge of the foot support platform 32 moved toward the axle, as shown in FIG. 22. This axle movement results in the axle 36 pivoting with a component of the pivoting in a plane substantially parallel to plane of the travel surface or the top of the foot support platform 51, with the wheel 34R or 34L at one end of the axle moving forward and the wheel 34L or 34R on the other end of the axle moving rearward, in relation to the direction of travel, causing a turning effect. Depending on the location and orientation of the axle bearing surface 38 and the 'pivot member 40 or 80 or 90, the direction and magnitude of the turning effect can be varied, such as to be more sensitive, less sensitive, to turn in the direction of leaning or compression of the foot support platform 32 toward the axle 36 or away from the direction of leaning or compression of the foot support platform 32 toward the axle 36. When the rider shifts position to move in a different direction, the contact zone 107 of the axle 36 with the pivot member 80 or 90 will shift as well, with the axle 36 contacting different points along the pivot member 80 or 90 related to the curved line 94 interface of the pivot member 80 or 90 and the axle bearing surface 38.

Figure 18B:
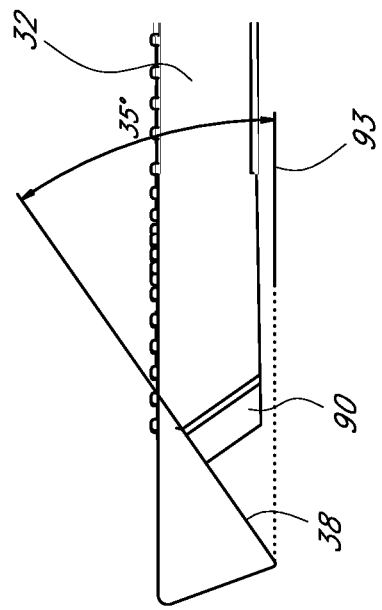
FIG. 18B is a side view showing the relative orientation of the curved pivot member and bearing surface to the ground.
Figure 18A:
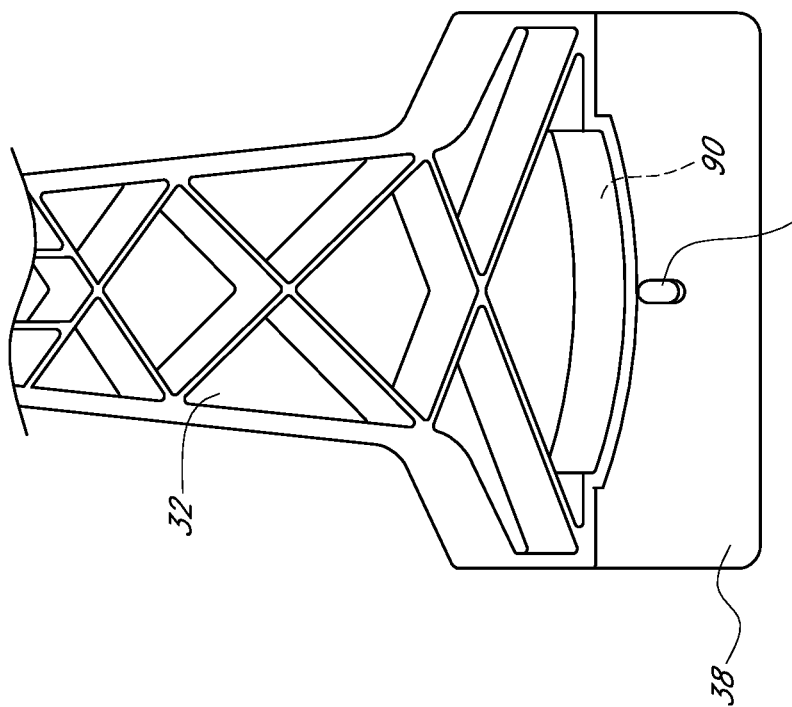
FIG. 18A is an oblique bottom view showing the curved pivot member and axle bearing surface.

In FIG. 18A, an embodiment of a curved extended pivot member 80 having an approximately constant radius of curvature is shown. In other embodiments, the curved extended pivot member 90 can have a variable radius of curvature, such as with the central portion having a larger (flatter) radius of curvature than the outboard portions. Such a variable curvature can be advantageous, for example, in providing increased straight line stability, with minor shifts by a rider causing only small shifts in the axle position, while still allowing sharp turns. Suitable amounts of curvature include radii of about 80 to about 300 millimeters, while some embodiments can have radii of about 110 to about 220 mm or about 120 to about 180 mm, with some special embodiments having even higher or lower amounts of curvature. Suitable degrees of curvature can relate to the angle the bearing surface 38 forms with the horizontal plane, the sharpness of the turn desired, the dimensions of the foot support platform 32, the size of the rider, etc.

In FIG. 18B, the angular relationship of one embodiment of a curved extended pivot member 90 to an axle bearing surface 38 is shown. The included angle between the axle bearing surface 38 and the curved extended pivot member 40 can be any suitable angle, including angles of about 45 to about 135°. In some embodiments, the angle can be about 75 to about 110°, or about 85 to 95°. The angle between the axle bearing surface 38 and the horizontal plane 93, can be about 10 to about 70°. In some embodiments, this angle can be about 20° to about 50°, or about 20° to about 40°, or about 25° to about 35°. Changes to either of these angles can provide the ability to, for example, adjust the turning response of the device as desired.

In another embodiment, as illustrated in FIG. 13, a pivot member with a ridge axle contact area is used, but the inclined axle bearing surface is no longer planar 88A and 88B. The mode of action will be described later in this document. In some embodiments, a non-planar inclined axle bearing surface can be combined with an extended pivot member or a curved extended pivot member. In some embodiments, the face of the extended pivot member or curved extended pivot member which has the axle contact area can be curved in both a horizontal and a vertical direction. In various embodiments, the nonplanar surface can be made of or approximate a number of planar surfaces, or it can be continually curved.

In some embodiments, pivot member 40 is not included for the integral truck to function in the intended way. In the absence of a fixed pivoting axis 43, the axle will float on the springs 44R and 44L, providing a compliant suspension.

In some embodiments, the pivot member can be a pin or a rod. In some embodiments, the pivot member can contact the exterior of the axle, such as at a round, flat, grooved, dimpled, indented, etc. portion of the axle or covering; in some embodiments, the pivot member can contact the interior of the axle, such as in a hole; and in some embodiments, the pivot member can contact the interior and exterior of the axle. In some embodiments, the axle 36 can include a covering over at least a portion of its surface, and the pivot member can contact the exterior or interior of the covering portion of the axle 36. The pivot member can be a pin protruding from the center of the axle 36 at a right angle or another angle to the axle, said pin can protrude into a hole or cavity formed in a middle portion of the inclined axle bearing surface 38. In some embodiments, different locations for the pin in the axle, the axle bearing surface, or both, for various reasons including to modify the ride characteristics of the conveyance, to facilitate construction or assembly, etc. In some embodiments, more than one pin can be utilized.

Figure 19A:
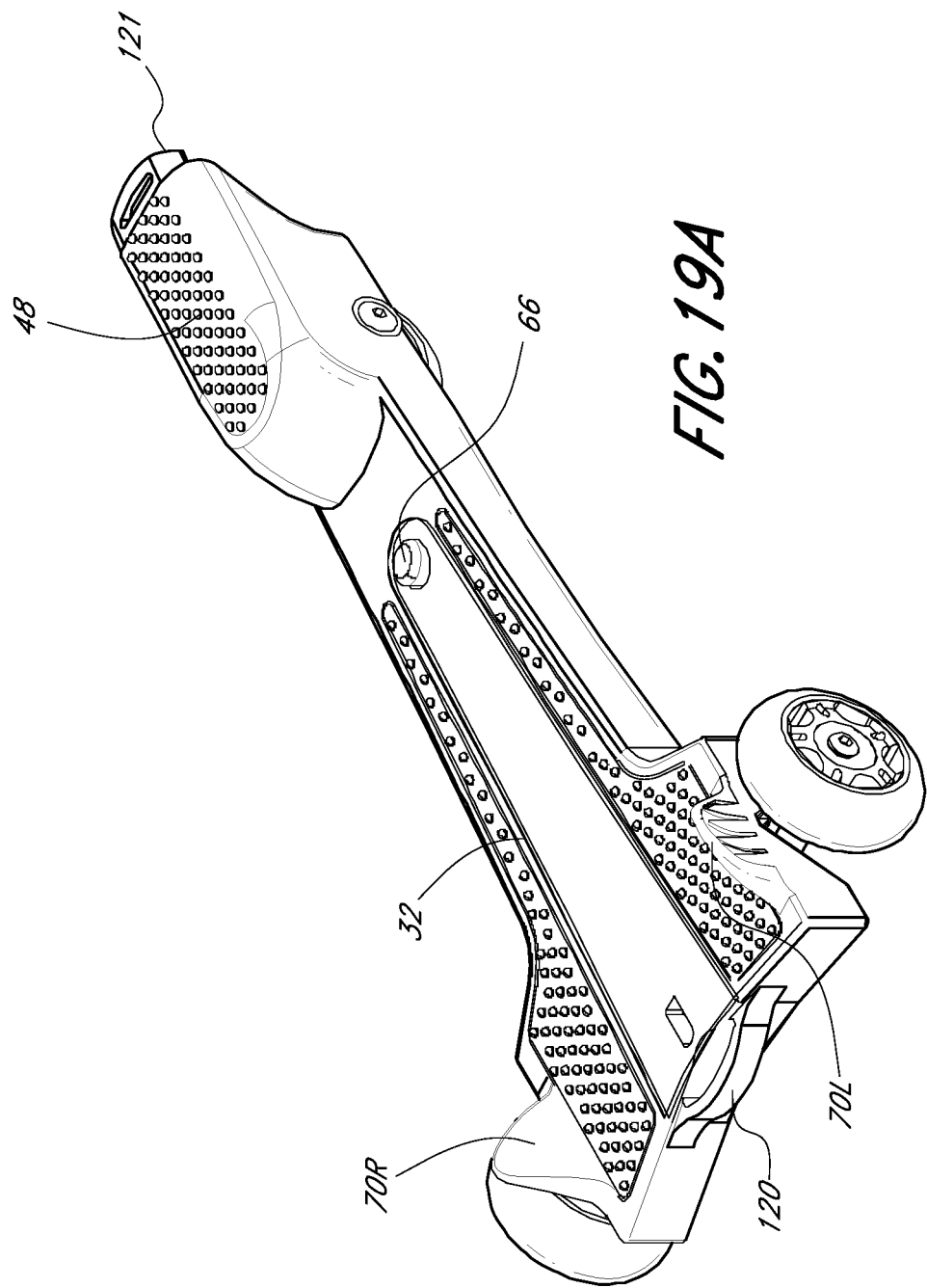
FIG. 19A is an oblique top view of one embodiment of the device showing the brake actuator and the fenders.
Figure 20B:
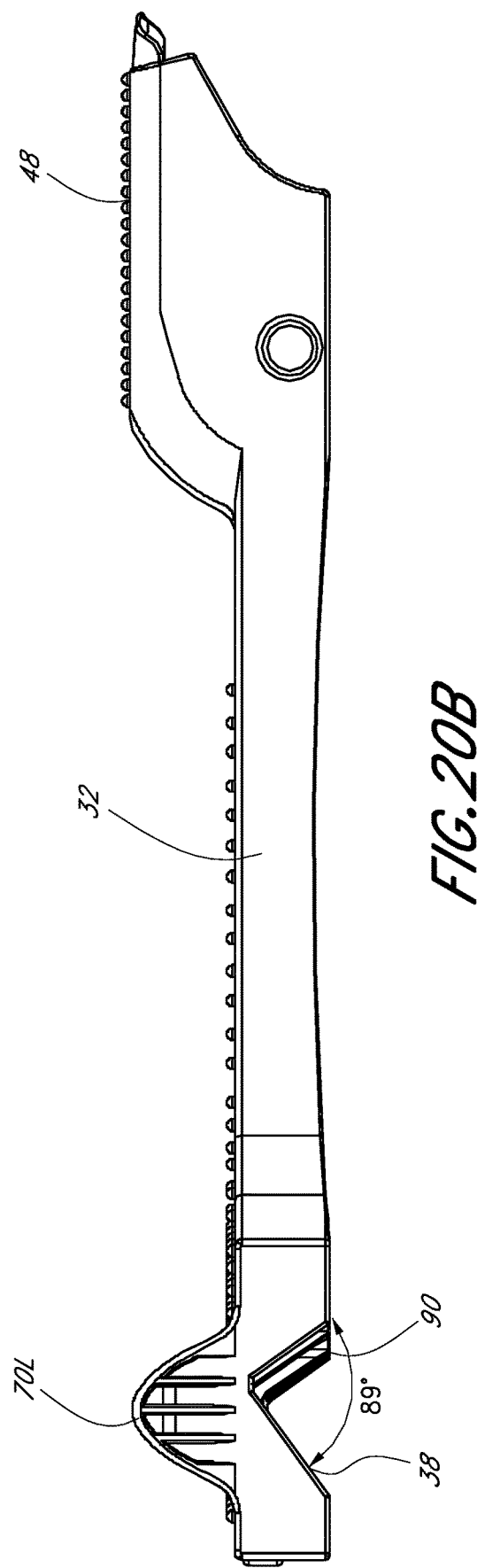
FIG. 20B is a side view of one embodiment showing relative angles of the angle between the pivot member surface and the bearing surface.

In some embodiments, the bearing surface can be a continuous or a discontinuous surface. Suitable discontinuous surfaces include those made up of a number of separated surfaces or surfaces interconnected with a different material or a recessed material. Individual surfaces can be made of like or unlike materials. Individual surfaces can be flat, curved, circular, rectangular, regular, a regular, interlocking, non-interlocking, or any other suitable shape as desired. In some embodiments, the surface of the pivot member can be a continuous or discontinuous surface as well. In some embodiments a continuous bearing surface can be utilized with a pivot member having a discontinuous surface, or a discontinuous bearing surface can be utilized with a pivot member having a continuous surface, or both the bearing surface and the surface of the pivot member can be either continuous or discontinuous. In some embodiments, the pivot member or the bearing surface can be made up of a series of individual parts, such as in the form of ridges protruding from a support material or a separate part. Examples of discontinuous faces on the axle bearing surface and the pivot member surface are shown in FIGS. 19B, 20A and 22. In FIG. 20A for example, the axle bearing surfaces and pivot members surfaces are formed by an opened cell network performed by a plurality of struts, which are chosen of a spacing and thickness of material sufficient to withstand relevant forces from the axle. FIGS. 20A and 22 show an extended curved surface 122 arranged symmetrically across the longitudinal access of the conveyance. As shown, the pivot surface extends a substantial proportion of the width of the device in this area. In these figures remaining in that area is shown in recessed portions 124 and 125.

In some embodiments, the device may have one or more handles attached to or formed therein. Such handles can aid in riding the device or performing maneuvers and/or can be used to attach pulling cords and the like. Preferably the forward end or front end of the device has an handle. The rear of the device may also have a handle, for example as is shown in FIGS. 19A, 19B, (120, 121).

In some embodiments, the pivot member can be disposed at an angle to the bearing surface, such as where the bearing surface and the surface of the pivot member intersect at the vertex 106 of an angle, as shown in FIG. 20A. In one embodiment, the pivot member can be disposed at an angle to the bearing surface with a gap between the surface of the pivot member and the bearing surface, such as where a continuation of the pivot member surface or the bearing surface could intersect with the other. In one embodiment, additional material can be interposed between the surface of the pivot member and the bearing surface, such as in the vicinity of the vertex of the angle. In some embodiments, the entire pivot member and the bearing surface can be separated such as by a gap or by intervening material.

Figure 21:
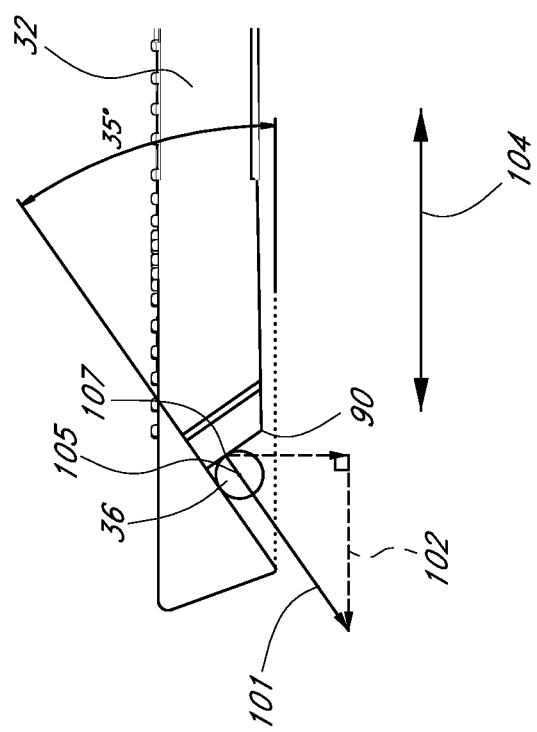
FIG. 21 is a diagram of the device showing the components of the normal ray.

In some embodiments, as shown in FIG. 21, the surface of the pivot member can be located such that a ray 101 originating from a contact zone 107 of the axle 36 with the surface of the pivot member 90, normal to the axle and passing through the axle centerline 105 ("normal ray") has a component 102 substantially parallel to the direction of travel 104. In some embodiments, the surface of the pivot member can oppose the bearing surface, such as where a normal ray intersects the bearing surface or intersects with a plane that would be an extension of an edge of the bearing surface or a plane that includes it is parallel to a portion of the bearing surface that contacts the axle.

Figure 15:
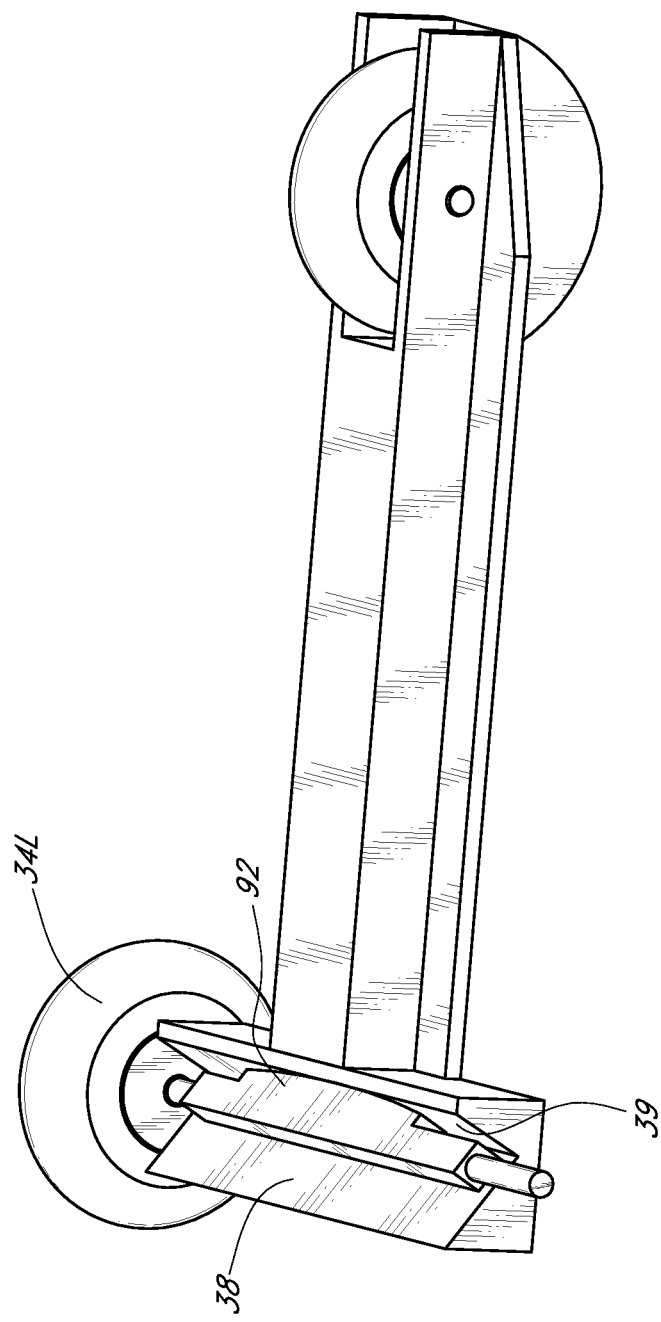
FIG. 15 shows an overmolded axle block 92. This version of the axle block includes an integral curved extended pivot member that engages with the surface 39, and a smooth planar section that is flush with the inclined axle bearing surface 38.

In FIG. 15, an overmolded axle block 92 is depicted. This may be a simple rectangular prism used in conjunction with the springs and/or pivots described previously, or may incorporate an extended pivot member section as illustrated, including optional curved and non-curved portions. The axle block 92 can be integral to the axle, or assembled to the axle.

Figure 4:
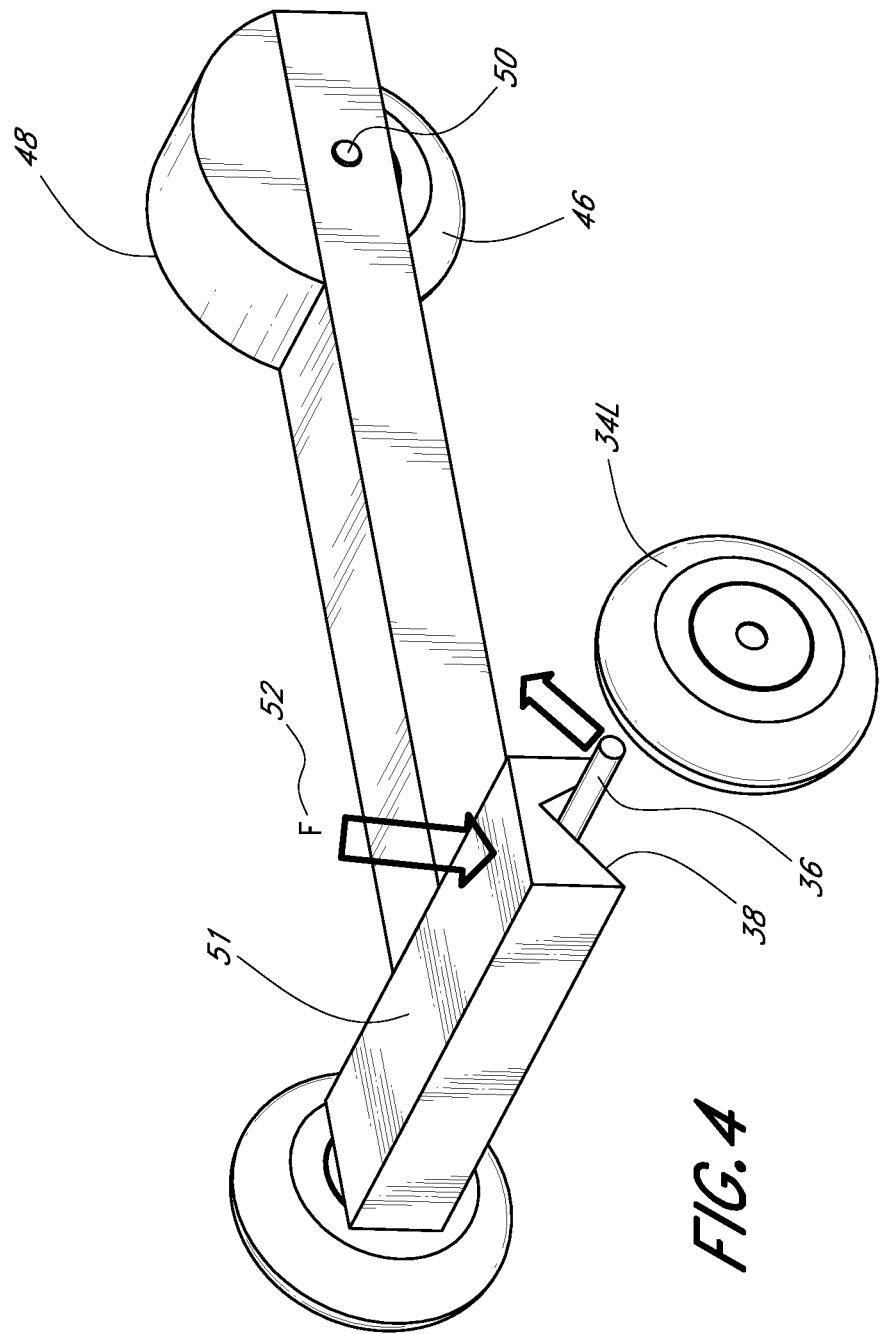
FIG. 4 shows a perspective view of the skateboard indicating how the integral truck produces a linkage between tilting of the platform about an axis parallel to the principle direction of travel and turning of the axis about an axis normal to the inclined axle bearing surface 38.

The mode of action of the axle support unit with an inclined axle bearing support surface 38 is in some embodiments will now be described. In FIG. 4, when a downward force 52 is imposed on the left front side of the platform, or a compressive force between the axle support unit and the axle, the left front wheel 34L is forced rearward or forward, depending for example on the location and orientation of the inclined bearing surface 38 and the pivot member 40 or 80 or 90, by the inclined axle bearing surface 38 that supports it, inducing a turn to the left or right, provided that the platform or board leans into the turn. As the downward or compressive force 52 is imposed, at least a portion of the axle 36 slides across the inclined axle bearing surface 38 and the axle pivots, a component of the rotation lying in a plane substantially parallel to the top surface of the foot support platform 32. In some embodiments, an outboard portion of the axle 36 slides across the bearing surface. If the axle includes a covering, spacer, etc. which contacts the axle bearing surface 38, the covering, spacer, etc. portion of the axle 36 will slide across the surface. The sliding motion can be described in some embodiments as an arc, a displacement, or a combination of an arc and a displacement. Hence the design can be set-up so the rider leans left and turns left, into his lean, facilitating a balancing and turning action similar to that of a conventional skateboard, or in some applications, he turns right when he leans left.

In the drawings, the conveyance is represented as a three-wheeled device, with a single rear wheel, but it should be understood that the single rear wheel may be replaced by a second integral truck and wheel assembly which is the minor image of the front truck and wheel assembly about a plane whose normal vector is the long axis of the conveyance 82.

In some three-wheeled embodiments, the fender 48, can serve as a platform for the rider to rest his pushing foot, when coasting down a hill for example. A four-wheeled device, can include a cantilevered beam, fixed with respect to the main riding platform and preferably molded as part of a foot support platform, protruding from the rear end of the foot support platform, behind the rider's heel, and can include such features as fender and brakes as desired.

The rear fender 48 can be made to be flexible or compliant, so that with heavier pressure from the foot resting on it, it could serve as a brake by deforming and engaging with the rotating rear wheel 46 below it. An integral leaf spring could be formed in the elastic material of the fender to facilitate this motion. The entire fender could also be made to pivot around an axis parallel to but not coaxial with the rear axle, where resistance to pivoting would be supplied by a spring. In various embodiments, the fender would not engage the wheel with moderate pressure exerted by resting the rider's pushing foot during coasting, but would engage with heavier pressure applied by transferring weight to the pushing foot if the user wished to stop the conveyance. Resistance to the fender pivoting action could be applied by a torsion spring, or a rigid lever arm combined with a tension or compression spring.

The compression springs 44R and 44L can be attached to the platform with an adhesive or adhesive tape, or can be retained in a slot or cavity molded or cut in the spring bearing surface 39. The product may be provided with a set of springs of differing stiffnesses to accommodate riders of various weights. Such a set of springs may be color coded. Although the springs 44R and 44L in the various figures provided are depicted in a somewhat central location for clarity, in practice it would be advantageous to position them as close to the wheels 34R and 34L as possible, to minimize the bending moment on the axle 36.

Another method of providing variable resistance to turning can include placing the springs 44R and 44L in a slot formed in the spring bearing surface 39, where the position of the springs along the axle 36 could be adjusted. If the springs 44R and 44L are moved towards the center of the spring bearing surface 39 (and closer to each other) the resistance to pivoting of the axle can be reduced, which might be desirable for a lighter rider. With the springs in wider positions (farther from each other), the resistance to pivoting of the axle can be increased, which might be desirable for a heavier rider. Higher resistance to pivoting can occur with the springs located directly adjacent to the wheels, 34R and 34L. However, a tradeoff can also be made with softer springs in a wider position to achieve similar or less resistance to pivoting as stronger springs in a narrower position. In this embodiment, it can be advantageous to have the springs seated in a slot formed in the spring bearing surface 39, with sufficient friction to look them in place when the conveyance was in use, but sufficient clearance so that they could be shifted along said slot to adjust the turning resistance of the conveyance.

Frequently in this description the full-width or partial-width inclined axle bearing surface 38 is described as formed as an integral part of the platform, however, it should be understood that even where the inclined axle bearing surface 38 is shown as full-width in all the drawings, the inclined bearing surface 38 can be narrower and can provide support to the axle 36 near the wheels, away from the wheels, or both near and away from the wheel, and the support for the axle can be continuous, or at discrete points over at least a portion of the length of the axle. Variations of these aspects of the design can provide additional benefits such as reducing the bending moment experienced by the axle over that experienced by axles in other designs. In some embodiments, the reduced bending moment of the axle 36 means that the axle can be of smaller diameter and lower cost and weight. In some embodiments, the inclined axle bearing surface 38 may be cut away or not in contact with the axle 36 in the central part of the platform 32, near the pivot member 40 or 80 or 90.

Further, the inclined axle bearing surface 38 is at various points shown and described as part of a unitary body, such as can be produced by injection molding the platform 32 and inclined axle bearing surface 38 in one shot from a suitable thermoplastic. However, it should be readily apparent that the inclined axle bearing surface 38 could be molded or formed from a different material and snapped or fastened to the main platform body 32. For example, it may be desirable to have an inserted surface with low friction and/or high wear resistance. In addition, the body and/or platform can be made from multiple pieces and then assembled. It should be noted, however, that a unitary construction can have advantages of a higher resistance to bending than some other designs, and thus may be preferred in some cases, and can result in reduced the weight and cost, including fabrication costs of the conveyance while maintaining an adequate bending stiffness of the platform 32.

In one embodiment, leaf springs are integrally formed as part of the spring bearing surface 39 of the foot support platform 32 and replace springs 44R and 44L. This embodiment is dependent on the body of the unitary platform being constructed of a resilient, elastic material.

In some embodiments, the platform can be attached to the rider's shoe such as with a flexible or semi-rigid strap 68 fastened to the body 32 somewhere between the front and rear wheels. Such a strap, lace or other attachment may be quickly fastened to itself with, for example, Velcro® on top of the rider's shoe, or otherwise. In some embodiments, a Velcro® patch or other releasable engagement means could be added to the sole of the rider's shoe to engage with its counterpart attached to the platform of the conveyance. In some embodiments, a special set of shoes with slots molded in their soles to engage a tab to be molded in the upper surface of the conveyance, or to provide engagement for a binding system such as is used for bicycles, skis, snowboards, etc. can be used. In some embodiments, various other attachment systems or devices can be used, such as those used for attaching a roller skate, ski, snowboard, water ski, or other conveyance to a shoe, boot, or foot may also be employed.

Figure 6:
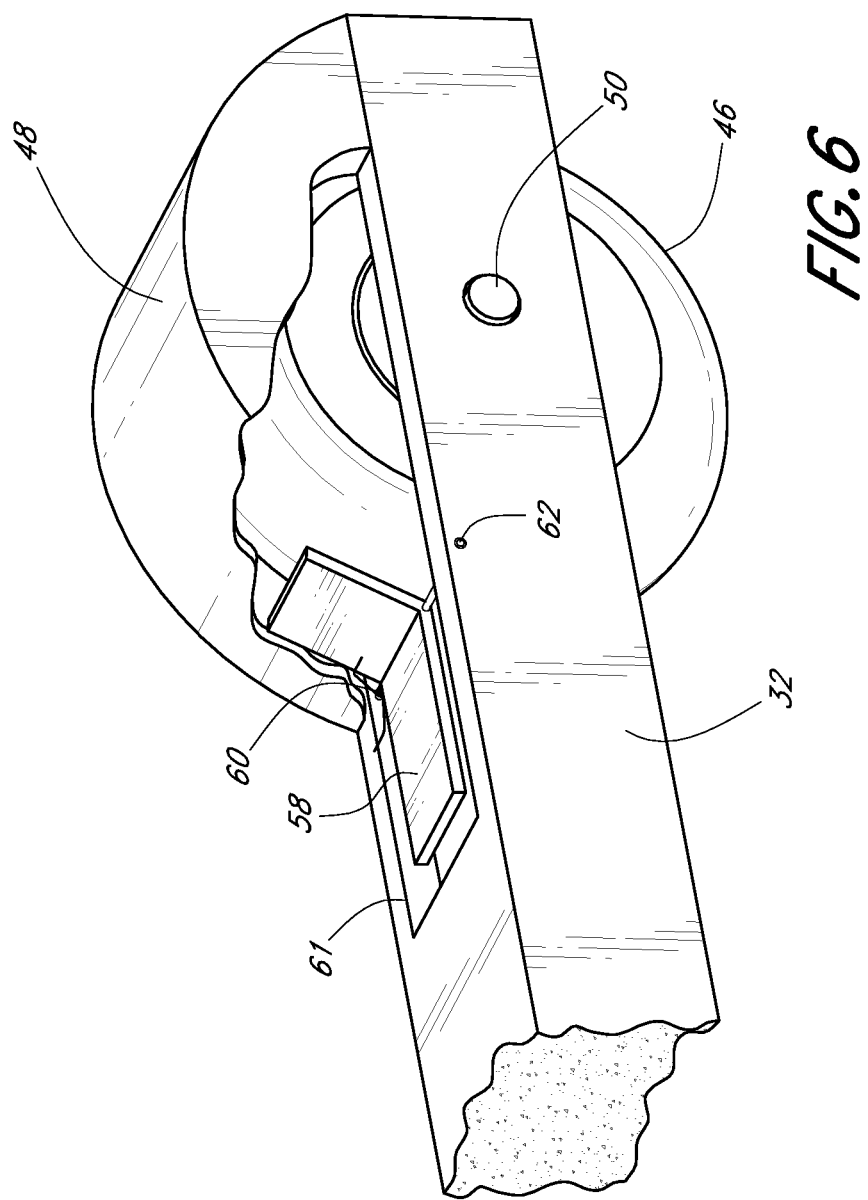
FIG. 6 shows a perspective view of a deadman's brake assembly, with the fender 48 partially cut away.

A deadman's brake assembly is depicted in FIG. 6, where the rear fender 48 has been cut-away for clarity. The torsion spring 60 causes the angled lever 58 to engage the rear wheel and slow or stop the conveyance when the rider falls or steps off. The point of contact of the angled lever with the wheel is designated the "friction pad." When the rider is riding the conveyance, his or her heel can engage the front part of the angled lever 58 forcing it into a depression 61 formed in the platform 32 and disengaging it from the rear wheel 46, allowing the conveyance to roll unimpeded. The angled lever 58 can be supported by an axle 62. The torsion spring 60 could be replaced with a compression spring (coil, rubber, etc.) located, for example, between the horizontal portion of the angled lever 58 and the floor of the depression 61 in the platform body 32.

Figure 8C:
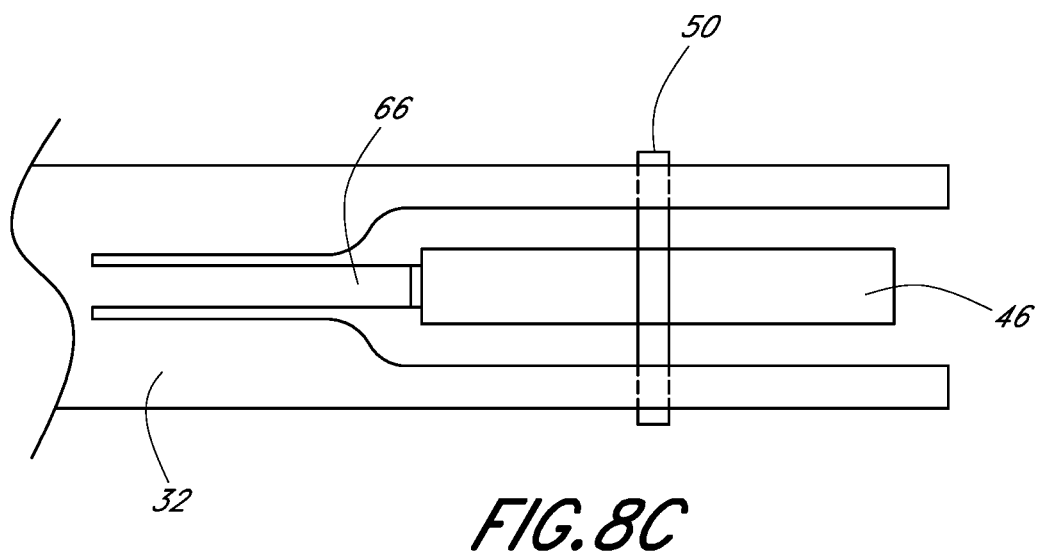
FIG. 8*c* shows a top view of this brake formed as an, integral part of the unitary skateboard platform.

In FIG. 8, an embodiment of a deadman's brake assembly in which the angled lever is replaced by a tab that is formed as an integral part of the platform 32 is depicted. This embodiment has the body of the foot support platform 32 being constructed of a resilient, elastic material that can deform elastically when the user's foot depresses the tab. In another embodiment, a material such as polypropylene, into which a living hinge can be molded could be used, with an optional secondary spring to provide at least a portion of the force that the deadman's brake applies to the wheel.

Figure 7:
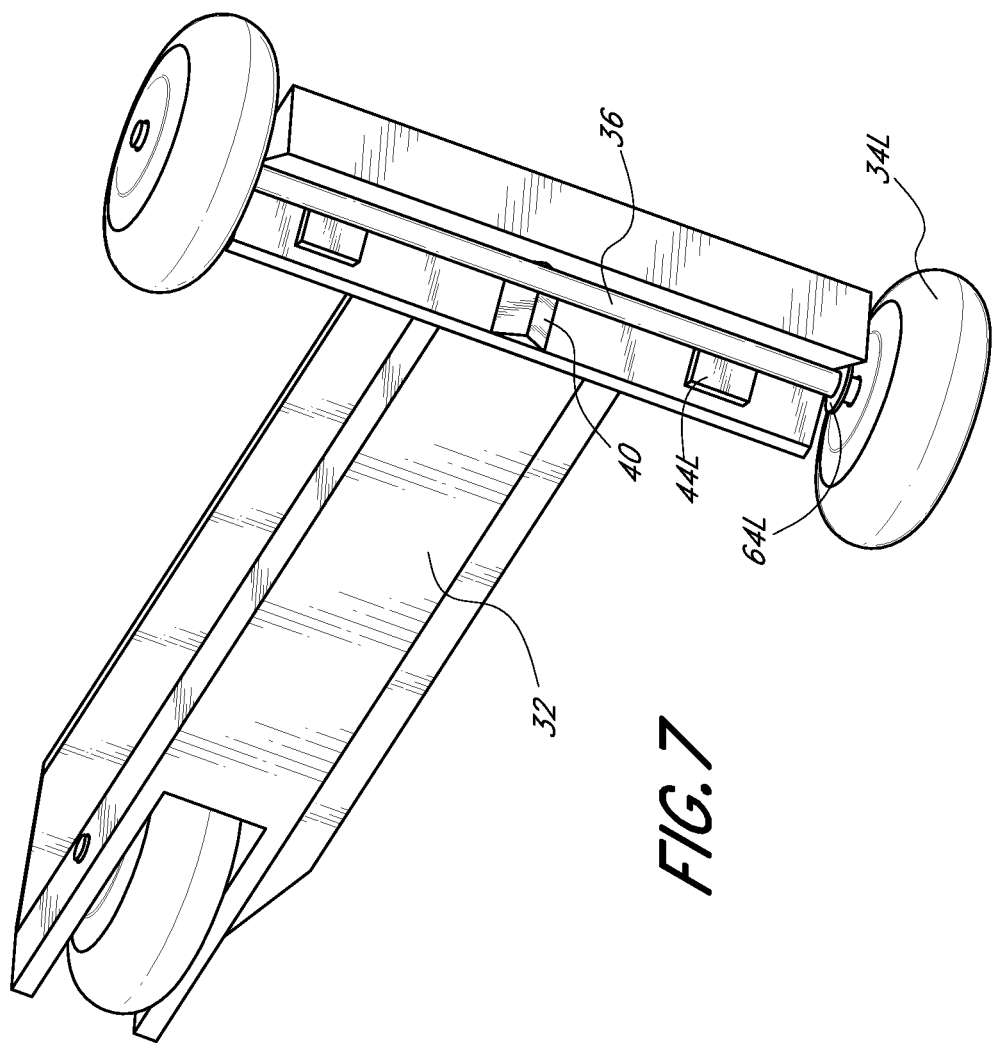
FIG. 7 shows a perspective view of the axle 36 including a retention ring 64L inboard from the left wheel that is used in conjunction with a second ring adjacent to the right wheel 64R to keep the axle 36 from sliding parallel to its axis.

The axle 36, can be prevented from sliding side to side relative to the longitudinal axis 82 of the platform 32. This may be accomplished in various ways. In one embodiment, a cylindrical pin is welded to the axle or screwed into a cavity in the axle such that the central axis of the cylindrical pin passes through a central area of the axle. Said pin protrudes from the axle, and fits in a hole formed in a corresponding portion of the inclined axle bearing surface 38. In some embodiments, the pin can function as a pivot member 40. In another embodiment, the axle can be positioned by two disks 64L and 64R fastened at a fixed axial position to the axle 36 between the wheels 34L and 34R and the outermost edges of the inclined axle bearing surface 38 of the platform 32, as depicted in FIG. 7.

Figure 3:
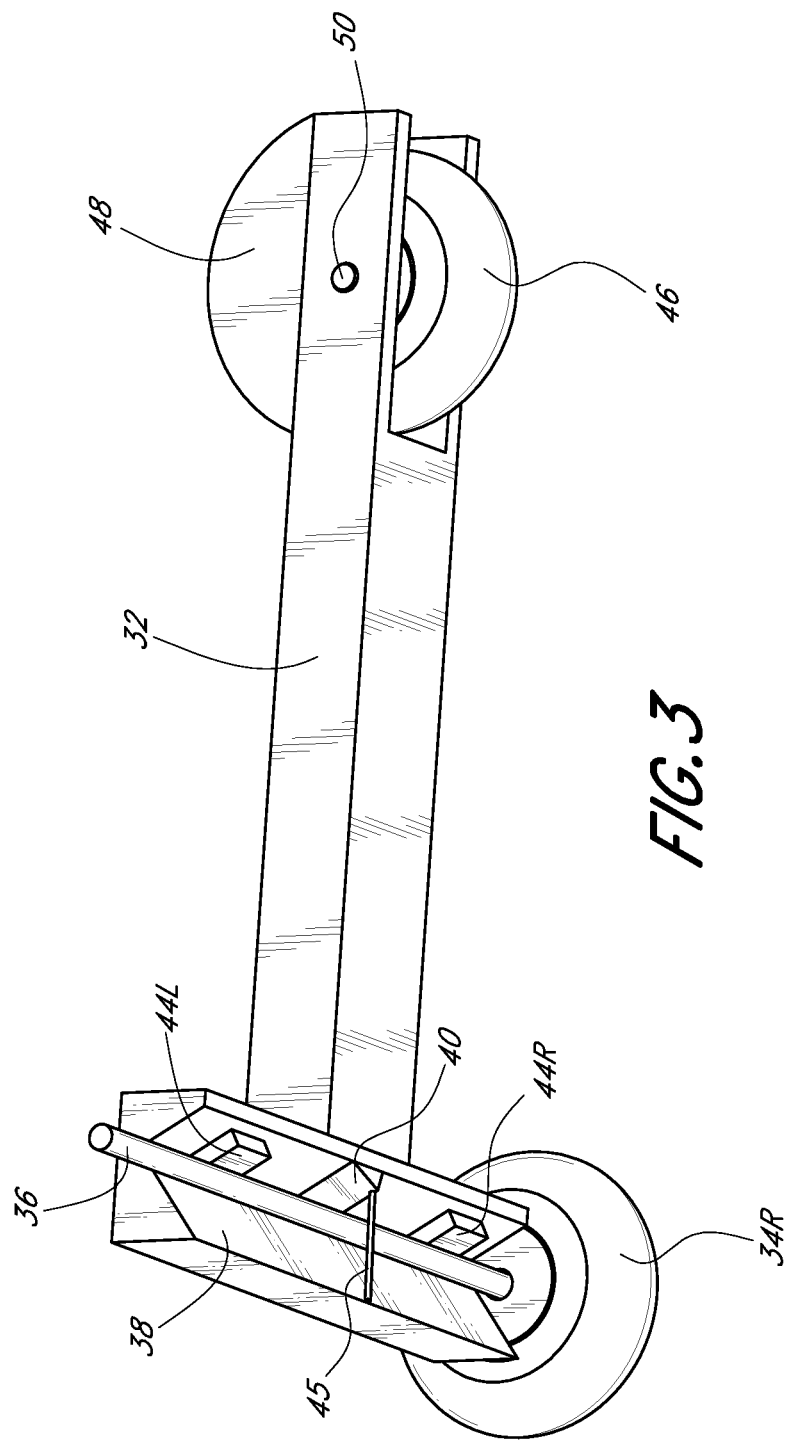
FIG. 3 shows a perspective view of the skateboard with the front left wheel removed to reveal the integral truck assembly. The primary elements of this truck are the inclined axle bearing surface 38, the axle, 36, the compression springs 44R and 44L, the pivot member 40, and the axle retention device 45.

When the rider is riding the conveyance and exerting a downward force on the platform, the axle can be held in its vertical location relative to the foot support platform 32 and the axle bearing surface 38 by the balance of forces; since the ground exerts an upward force on the axle through the wheels. In some embodiments it can also desirable to provide a means of retaining the axle in position relative to the inclined axle bearing surface 38 if the rider picks the conveyance off the ground. For example, in FIG. 3, a rod 45 has been inserted in a hole drilled in the pivot member 40. This rod 45 wraps underneath the axle 36, and can, for example, hold the axle securely against the inclined axle bearing surface 38 or otherwise prevent the axle from falling off. In another example, as shown in FIG. 16, a pin 94 passes through the axle 36 and a slot or hole 91 in the axle bearing surface 38. Preferably, the slot will allow sufficient travel for the axle to move and turn in response to the efforts made by a rider to turn. A retention means could also be built into the compression springs 44R and 44L by having a protuberance in the springs hook around the underside of the axle. Alternatively, a band of the material of which the unitary platform 32 is constructed (not depicted) passing underneath the axle may be molded as an integral part of the unitary platform. It should be noted that the various retention devices shown can be used with the various pivot members and axle bearing surfaces described herein.

In some embodiments, the axle 36 can be a solid or unitary cylinder. In some embodiments, the axle 36 can be non-solid, multi-piece, or a shape other than a cylinder. The axle can have any other cross-sectional shape, including square, rectangular, variable, etc., and the axle can be hollow, multi-part, a single piece, etc. In some embodiments, the axle can have one or more holes, cavities, indentations, extensions, protrusions or other shape features, such as for receiving a spring, a pin, an axle retention device, etc. or for other purpose, such as to contact a bearing surface or a pivot member. In some embodiments, a second material, such as a polymer or aluminum composition can be molded over the axle to form an axle block 92 in the region between the wheels 34R and 34L. Alternatively, the axle block may be a formed from a single material, with cylindrical axle segments formed from a second material or the same material protruding from either end. In either case, the axle block 92 could include a flat plane to sit flush on the inclined axle bearing surface 38, or another shaped surface that can interface with a similar or matched surface of the axle bearing surface 38, which in some embodiments can reduce wear on these surfaces. In some embodiments various features needed to retain the axle 36 and wheels laterally and vertically could be readily molded into the axle block. For example, a central locating pin transverse to the axle, or locating washers 64L (and 64R, not depicted) may be molded as part of the axle block.

In some embodiments, the axle could be fitted with bearings or bushings near the wheels so that said bearings or bushings provide rolling contact with the inclined axle bearing surface 38, in order to, for example, modify the steering response or reduce the wear and, friction associated with sliding of the axle 38 on the inclined axle bearing surface 38. In some embodiments, sliding contact can be reduced or eliminated. Bearings can be used to support the axle at a more central position, or only at a position just inside the wheels, or additional bearings or wider or multi-race bearings can be use to provide support along more of the axle's width.

In FIG. 15, an overmolded axle block 92 is depicted. In some embodiments, this can be a simple rectangular prism used in conjunction with the springs and/or pivots described previously, or may incorporate an extended pivot member section as illustrated, including optional curved and non-curved portions. In some embodiments, a narrow surface similar to a pivot member 40 can be incorporated into an axle block or a broad surface similar to an extended pivot member 80 or a curved extended pivot member 90. The axle block 92 can be integral to the axle, or assembled to the axle.

Figure 5:
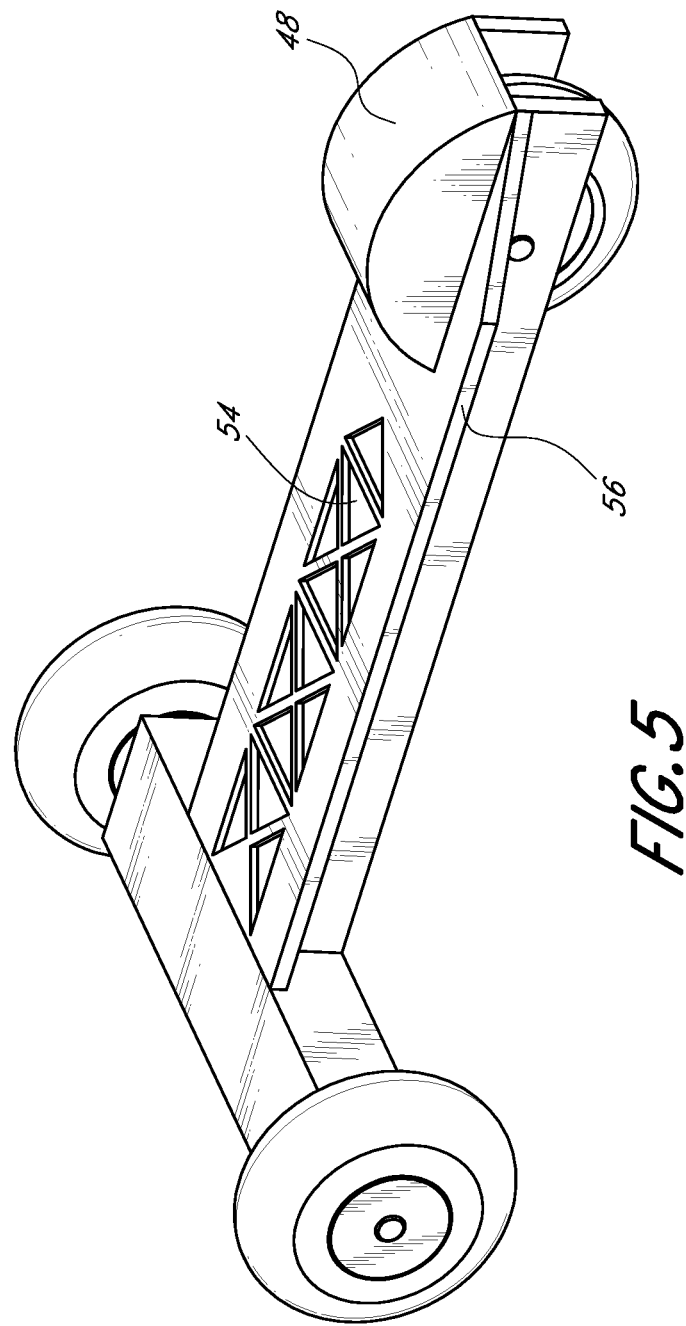
FIG. 5 shows a perspective view of a skateboard molded from a thermoplastic, with weight reduction features found in typical thermoplastic moldings, and molded flanges on the top surface of the platform intended to increase its resistance to bending about an axis parallel with the rear axle 50.

In some embodiments, a substantial portion of a conveyance can be molded out of a plastic material or a thermoplastic fiber reinforced thermoplastic composite as a single piece or as a small number of pieces for assembly, such as, the foot support platform 32, the rear fender 48, the inclined axle bearing surface 38, the pivot member 4G, any special means for retaining the compression springs 44L and 44R, the deadman's brake 60, and other features could all be molded in a single injection molding operation. In some embodiments, all or a portion of the parts can be produced separately. In some embodiments, some of these parts can be left out, for example the rear fender 48, the deadman's brake 60, or other features or combinations of features as desired. Such molding can result in reduces cost and/or reduced weight of the conveyance. In some embodiments, features can be designed to simultaneously increase the stiffness and strength of the conveyance, while reducing the cost and amount of material, used. In FIG. 5, examples of molded-in cavities 54 are depicted. Variations of the design of molded-in cavities are possible, such as are used in the production of various items including those found in the lower leg assembly of a pedestal office chair, where said assembly was molded from a thermoplastic. In some embodiments, an extended flanges 56 on the central portion of the platform 32 in FIG. 5 can be incorporated, for example, to increase the bending stiffness of the foot support platform 32 about an-axis parallel to the rear axle.

In some embodiments, portions of the device can be made from wood, metal, or some other appropriate material having appropriate characteristics of weight, stiffness and durability. In some embodiments, all or portions of the device can be machined, such as out of plastic, fiber reinforced plastic, metal, or wood. In some embodiments, parts can be cast or stamped out of metal. Suitable metal for construction of the device include steels and alloys of steel, nickel and/or chromium containing materials, aluminum, titanium, copper, brass, bronze, etc. In some embodiments, a lighter material can be utilized for a portion of the device and a harder or more durable material for another portion. Elastomers can be utilized for portions of the device as well.

In some embodiments, a gravity or centrifugal force can be utilized to provide assistance in recovering the conveyance from a turn. A gravity or centrifugal force can be used in conjunction with springs, such as coil, leaf, elastomer, etc, or they can be used without springs. The recovery from turning can be induced without springs by, for example, ensuring that as the axle pivoted, the central portion of the foot support platform 32 was forced away from the axle (See FIG. 4). This case, the central portion of the foot support platform 32 would be forced to increase in altitude as the conveyance was tilted and the axle pivoted. (In this document, altitude is defined as the distance from the road surface, or a plane having an analogous relationship to the wheels as a road surface, along an axis normal to the road surface or plane.) The central portion of the foot support platform 32 would normally be at a lower altitude from the road surface or analogous plane, and its altitude would increase if the axle pivoted in either direction. A similar position restoring force can be provided by the centrifugal force experienced while turning the conveyance. This linkage between the pivoting action, and an altitude increase of the foot support platform is referred herein as a "gravity spring", regardless of how it is accomplished. A gravity spring provides a restorative force to return the axle to its normal position substantially perpendicular to the centerline of the skateboard, and the skateboard travels in a substantially straight line unless the rider applies a torque about the centerline by leaning.

Benefits with a gravity spring can include in some embodiments self-adjustment of a turn restorative force to the weight of a rider or load, reduced number of parts for construction of the conveyance, and elimination of parts subject to breakage or wear and requiring repair or replacement. First, the turn restorative force tending to return the front axle to its normal position relative to the long axis of the conveyance 82 with a gravity spring can be related to the weight of the user, potentially rendering one set of parts suitable for riders having a range of weights. Second, the need for springs is eliminated, reducing the number of parts used in manufacturing and assembling the conveyance, and eliminating springs or bushings that can break or wear out.

In one embodiment, a gravity spring is made by using an elongated pivot member 80 or 90 rather than a single pivot point, as depicted in FIGS. 11, 12, 14, 16, 17, 18A and 18B. In this method, the inclined axle bearing surface 38 can be planar, as in previously described embodiments, or otherwise, and the pivot member 80 or 90 is shaped so that as a compressive force is applied between the axle bearing surface 38 and the axle 36, such as when the rider leans or shifts his weight, the pivot point (or point of contact between the axle 38 and the pivot member 80 or 90) shifts towards the wheel closest to the compressive force. This shift causes the axle to rotate in a plane parallel to the travel surface (i.e. turn). In some embodiments, the rotation of the axle can cause a turn in the direction of the lean or shift in weight as depicted in FIG. 12.

Since the pivot point is closer to the inside wheel (for this discussion, a system of lean left/turn left is assumed, but in some other embodiments, as with other parts of this description, this assumption can be reversed, as understood by one having skill in the art), as the axle 36 pivots, the rearward motion of the inside wheel is less than the forward motion of the outside wheel. Since the axle 36 is in contact with the inclined axle bearing surface 38, the inside wheel moves towards the top surface 51 of the foot support platform 32 by an amount less than the distance that the outside wheel moves away from the top surface 51 of the-foot support platform 32. The net result is that the distance between the central portion of the axle 36 and the nearest point on the top surface of the foot support platform 51 is increased when the axle 36 pivots, elevating the foot support platform and the rider. The center of the axle in the gravity spring, shifts down the axle bearing plane, moving it farther away from the top surface of the board, increasing the altitude of the deck, and providing a restorative force. The rider or load is closest to the road when the front axle 36 is perpendicular to the long axis of the conveyance 82, and at least a portion of his foot or the load is elevated whenever the conveyance tilts and the axle pivots in either direction. This contributes to the desired gravity spring effect that induces the conveyance to level out so that it travels in a substantially straight line unless the rider supplies a torque around the long axis 82 of the conveyance. The magnitude of the centering force imposed by the gravity spring can depend on the width and shape of the pivot member, the angle of the inclined axle bearing surface, as well as other factors. For simplicity, a simple rectangular extended pivot member 80 is shown in FIGS. 11-12, but this block could be rounded off, as long as pivoting of the axle 36 away from its position perpendicular to the long axis of the conveyance 82 produces a shift in the central portion of the foot support platform 32 away from the axle 36. A suitable curved extended pivot member is depicted in FIG. 14. Additional embodiments of curved extended pivot members are provided in FIGS. 16, 17, 18A and 18B.

In some embodiments, an extended pivot member 80 or 90 can be attached to the axle 36 instead of molding it as part of, or fixing it rigidly to, a stationary part such as a portion of the foot support platform 32 or the spring bearing surface 39. In some such embodiments, the spring bearing surface 39 or other portion that the axle block 92 interfaces with could he planar, and an axle block could be overmolded on the axle as described previously. The extended pivot member could be molded into the central region of the axle block 92, and bear against the spring bearing surface 39. Such an arrangement is depicted in FIG. 15.

Another embodiment of a gravity spring includes constructing the inclined axle bearing surface 38 to have a non-planar bearing surface as depicted in FIG. 13. In this embodiment, the inclined axle bearing surface is curved or segmented (88A and 88B), and the of the rear part of the surface 88B is less than the slope of the front part of the surface 88A, where the slope is measured by the angle between the plane and the top surface 51 of the foot support platform 32, however in some embodiments, the slopes of these two portions can be reversed, with the slope of the rear part of the surface 88B being greater than the slope of the front part of the surface 88A. In addition, other embodiments can have a greater number of differently sloped surfaces on the inclined axle bearing surface 38, or a curved surface or a variably curved surface where the radius of curvature changes along the surface. As the axle is induced to pivot by tilting the platform about its long axis 82, the inside wheel moves closer to the top surface 51 of the foot support platform 32 along the lesser slope of the rear part of the inclined axle bearing surface 88B. (Here the terms "inside" and "outside" refer to the conventional definitions of the inside and outside of the turn.) Meanwhile the outside wheel moves farther from the top-surface 51 of the foot-support platform 32 along the greater slope of the forward part of the inclined axle bearing surface 88A. Because of this, the outside wheel moves away from the top surface 51 by more than the inside wheel moves towards said top surface 51, and the altitude of the center of the top surface 51 of the foot support platform increases.

The inclined axle bearing surface can frequently be shaped so that the altitude of the center of the top surface of the foot support platform is lowest when the axle 36 is perpendicular to the long axis of the conveyance 82 or the altitude of the center of mass of the foot support platform 32 is lowest when the axle 36 is in its normal position, not influenced by an induced tilt of the foot support platform 32. This creates a gravity-spring that causes the conveyance-to travel in a substantially straight line (or the conveyance's normal direction of travel) if it is not deliberately tilted around its long axis 82 through the application of torque by the rider. In some embodiments, the inclined axle bearing surface 88 can have a complex curvature designed to facilitate keeping most of the axle in contact with the inclined axle bearing surface 88, regardless of the degree of pivot, which can have a larger slope towards the front of the conveyance, and a lesser slope towards the rear with a gravity spring unit mounted in the front portion of the conveyance and a larger slope towards the rear of the conveyance and a lesser slope towards the front with a gravity spring unit mounted in the rear portion of the conveyance.

In some embodiments, a gravity-spring unit can be combined with a set of compression springs 44R and 44 to create a combined force to restore the conveyance to substantially straight fine motion (or other normal travel direction as designed into the unit).

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

All references cited herein, including but not limited to published and unpublished applications, patents, and literature references, and also including but not limited to the references listed in the Appendix, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A transportation device configured to convey a rider, the transportation device comprising:
   a platform configured to support a foot of the rider, the platform extending along a longitudinal axis of the transportation device, the platform comprising a forward portion, an intermediate portion, and a rearward portion, the forward portion having a first width and the rearward portion having a second width, the first width being greater than the second width;
   a first front wheel positioned on a first lateral side of the forward portion of the platform and a second front wheel positioned on a second lateral side of the forward portion of the platform such that the forward portion is positioned between the first and second front wheels;

a rear wheel adjacent the rearward portion of the platform, the rear wheel positioned on the longitudinal axis of the transportation device;

an axle mount integral with the forward portion, the axle mount comprising an axle bearing channel and a pivot member, the axle bearing channel having a V-shaped cross-section and extending the first width of the platform; and an axle connected to the first and second front wheels, the axle located in the axle mount and configured to pivot about the pivot member.

2. The transportation device of claim 1, wherein the platform generally smoothly tapers inwardly along the intermediate portion from the forward portion to the rearward portion.

3. The transportation device of claim 1, wherein the axle bearing channel supports the axle adjacent each of the first and second front wheels.

4. The transportation device of claim 1, wherein the pivot member is positioned on the longitudinal axis.

5. The transportation device of claim 1, wherein the axle is configured to pivot relative to the platform such that when a first end of the axle pivots toward a front of the platform a second end of the axle pivots toward a rear of the platform.

6. The transportation device of claim 1, further comprising a brake configured to inhibit movement of the rear wheel.

7. The transportation device of claim 1, further comprising a bearing surface that supports the axle, the bearing surface being inclined at an angle of about 10° to about 70° relative to a horizontal plane.

8. The transportation device of claim 1, wherein the platform comprises a plurality of open cavities bounded by struts.

9. A transportation device configured to convey a rider, the transportation device comprising:
a front right wheel;
a front right fender associated with the front right wheel;
a front left wheel;
a front left fender associated with the front left wheel;
a rear wheel;
a rear fender associated with the rear wheel, the rear fender comprising a footrest configured to receive a pushing foot of the rider;
a platform configured to receive a support foot of the rider such that the support foot is bounded in part by the front right fender, front left fender, and rear fender and a front end of the support foot extends forwardly beyond a front end of the platform;
an axle mount connected with the platform the axle mount comprising an axle bearing channel and a pivot member; and
an axle connected to the front right wheel and the front left wheel, the axle comprising a rigid member, the axle located in the axle bearing channel and configured to pivot about the pivot member.

10. The transportation device of claim 9, wherein the front right fender, front left fender, rear fender, and platform are comprised in a single unitary component.

11. The transportation device of claim 9, wherein the platform is recessed below a top of the front right fender, a top of the front left fender, and a top of the rear fender.

12. The transportation device of claim 9, wherein the axle mount is integral with the platform.

13. The transportation device of claim 9, wherein the platform comprises a forward portion between the front right and left wheels and a rearward portion adjacent the rear wheel, the forward portion having a first width and the rearward portion having a second width, the first width being greater than the second width.

14. The transportation device of claim 9, wherein the rear wheel is on a longitudinal axis of the platform.

15. The transportation device of claim 9, wherein the front right fender and the front left fender are unitary with the platform.

16. The transportation device of claim 9, wherein the front right fender is connected to a right front lateral side of the platform and is configured to inhibit the rider's support foot from sliding off the right front lateral side of the platform, and wherein the front left fender is connected to a left front lateral side of the platform and is configured to inhibit the rider's support foot from sliding off the left front lateral side of the platform.

* * * * *